(12) United States Patent
Takayanagi

(10) Patent No.: US 9,912,867 B2
(45) Date of Patent: Mar. 6, 2018

(54) IMAGE PROCESSING APPARATUS, IMAGE CAPTURING APPARATUS AND STORAGE MEDIUM STORING IMAGE PROCESSING APPARATUS

(71) Applicant: CANON KABUSHIKI KAISHA, Tokyo (JP)

(72) Inventor: Wataru Takayanagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 15/198,515

(22) Filed: Jun. 30, 2016

(65) Prior Publication Data
US 2017/0006228 A1 Jan. 5, 2017

(30) Foreign Application Priority Data

Jul. 1, 2015 (JP) .................... 2015-132639

(51) Int. Cl.
*H04N 5/232* (2006.01)
*G02B 27/64* (2006.01)

(52) U.S. Cl.
CPC ....... *H04N 5/23261* (2013.01); *G02B 27/646* (2013.01); *H04N 5/23209* (2013.01); *H04N 5/23245* (2013.01); *H04N 5/23254* (2013.01); *H04N 5/23287* (2013.01); *H04N 5/23293* (2013.01); *H04N 5/23296* (2013.01)

(58) Field of Classification Search
CPC .......... H04N 5/23209; H04N 5/23245; H04N 5/23254; H04N 5/23261; H04N 5/23293; H04N 5/23296
See application file for complete search history.

(56) References Cited

U.S. PATENT DOCUMENTS

| 7,791,669 B2* | 9/2010 | Nonaka | H04N 5/23212 348/333.02 |
| 2006/0216010 A1* | 9/2006 | Yamanouchi | G03B 5/02 396/55 |
| 2008/0049145 A1* | 2/2008 | Yokoyama | H04N 5/232 348/699 |
| 2008/0094498 A1* | 4/2008 | Mori | G03B 5/02 348/352 |
| 2009/0135270 A1* | 5/2009 | Makino | H04N 5/144 348/222.1 |

(Continued)

FOREIGN PATENT DOCUMENTS

JP 2006-317848 A 11/2006

*Primary Examiner* — Daniel M Pasiewicz
(74) *Attorney, Agent, or Firm* — Cowan, Liebowitz & Latman, P.C.

(57) ABSTRACT

The image processing apparatus performing a process for displaying a still image acquired by an image capturing apparatus during its panning to follow a moving main object. The image processing apparatus includes a vector acquiring unit configured to acquire, from multiple motion vectors detected in a moving image acquired by the image capturing apparatus during the panning, a background motion vector, and a processing unit configured to determine, using the background motion vector, a background area of the still image where a background object is captured and to perform a magnification display process for magnifying the background area as compared with a case where the display unit displays the entire still image and causing the display unit to display the magnified background area.

13 Claims, 15 Drawing Sheets

(56) References Cited

U.S. PATENT DOCUMENTS

| | | | | |
|---|---|---|---|---|
| 2011/0032414 | A1* | 2/2011 | Sumiyoshi | H04N 5/2353 348/367 |
| 2015/0002684 | A1* | 1/2015 | Kuchiki | H04N 5/23232 348/208.4 |
| 2015/0237260 | A1* | 8/2015 | Mukunashi | H04N 5/23287 348/208.11 |
| 2016/0165138 | A1* | 6/2016 | Haruna | H04N 5/23254 348/208.3 |
| 2016/0165139 | A1* | 6/2016 | Takayanagi | H04N 5/23261 348/208.4 |
| 2016/0269636 | A1* | 9/2016 | Kuchiki | H04N 5/232 |
| 2016/0301871 | A1* | 10/2016 | Kuchiki | H04N 5/23261 |
| 2016/0344934 | A1* | 11/2016 | Kato | G06F 3/013 |

\* cited by examiner

CENTROID X=(X4+X5+X6x4+X7x3+X8x2)/11  (1)
CENTROID Y=(Y0x2+Y1x5+Y2x3+Y3)/11  (2)

SUMMED MOTION VECTOR NUMBERS
(VERTICAL PROJECTION)

AREA TO BE MAGNIFIED

IMAGE PROCESSING APPARATUS, IMAGE CAPTURING APPARATUS AND STORAGE MEDIUM STORING IMAGE PROCESSING APPARATUS

BACKGROUND OF THE INVENTION

Field of the Invention

The present invention relates to a technique for displaying a still image acquired by follow shot.

Description of the Related Art

The follow shot is an image capturing technique for expressing a sense of speed of a moving object. In the follow shot, a photographer (user) causes an image capturing apparatus to perform still image capturing while panning the image capturing apparatus so as to follow a movement of a main object that is a user's image capturing target and thereby can obtain a still image including a still main object image and a flowing (blurred) background image. However, a difference of a user's panning speed of the image capturing apparatus from a moving speed of the main object results in a still image including a blurred main object image.

Japanese Patent Laid-Open No. 2006-317848 discloses a method that, in order to provide an assist (follow shot assist) to a user performing follow shot, moves (shifts) a shift lens with respect to an optical axis to absorb a difference between a panning speed of a moving speed of a main object and an image capturing apparatus. Specifically, the method calculates, on a basis of a panning speed of the image capturing apparatus detected by a gyro sensor and a motion vector detected in a captured moving image (between consecutive frame images) during the panning, a shift amount of the shift lens to capture the main object at a center of an image capturing area and shifts the shift lens by the calculated shift amount, which enables good follow shot.

The user often checks the still image acquired by the follow shot with such a follow shot assist through a display unit such as an LCD provided with the image capturing apparatus.

However, the display unit provided in the image capturing apparatus is small in size. Therefore, displaying the entire still image acquired by the follow shot on that display unit makes it difficult for the user to check its image quality, such as a degree of stillness of the main object image and a degree of flowing of the background image.

SUMMARY OF THE INVENTION

The present invention provides an image processing apparatus capable of facilitating a user's check of a still image acquired by a follow shot through a display unit provided in an image capturing apparatus and provides an image capturing apparatus including the image capturing apparatus.

The present invention provides as an aspect thereof an image processing apparatus used in an image capturing apparatus including a display unit and configured to perform a process for displaying a still image acquired by the image capturing apparatus during its panning to follow a moving main object. The image processing apparatus includes a vector acquiring unit configured to acquire, from multiple motion vectors detected at multiple positions in a moving image acquired by the image capturing apparatus during the panning, a background motion vector corresponding to a background object different from the main object, and a processing unit configured to determine, using the background motion vector, a background area of the still image where the background object is captured and to perform a magnification display process for magnifying the background area as compared with a case where the display unit displays the entire still image and causing the display unit to display the magnified background area.

The present invention provides as another aspect thereof an image capturing apparatus including the above image processing apparatus.

The present invention provides as yet another aspect thereof a non-transitory computer-readable storage medium storing an image processing program to cause a computer of an image capturing apparatus including a display unit to perform a process for displaying a still image acquired by the image capturing apparatus during its panning to follow a moving main object. The process includes a vector acquisition process for acquiring, from multiple motion vectors detected at multiple positions in a moving image acquired by the image capturing apparatus during the panning, a background motion vector corresponding to a background object different from the main object, and a display process for determining, using the background motion vector, a background area of the still image where the background object is captured and for performing a magnification display process for magnifying the background area as compared with a case where the display unit displays the entire still image and causing the display unit to display the magnified background area.

Further features and aspects of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 3:
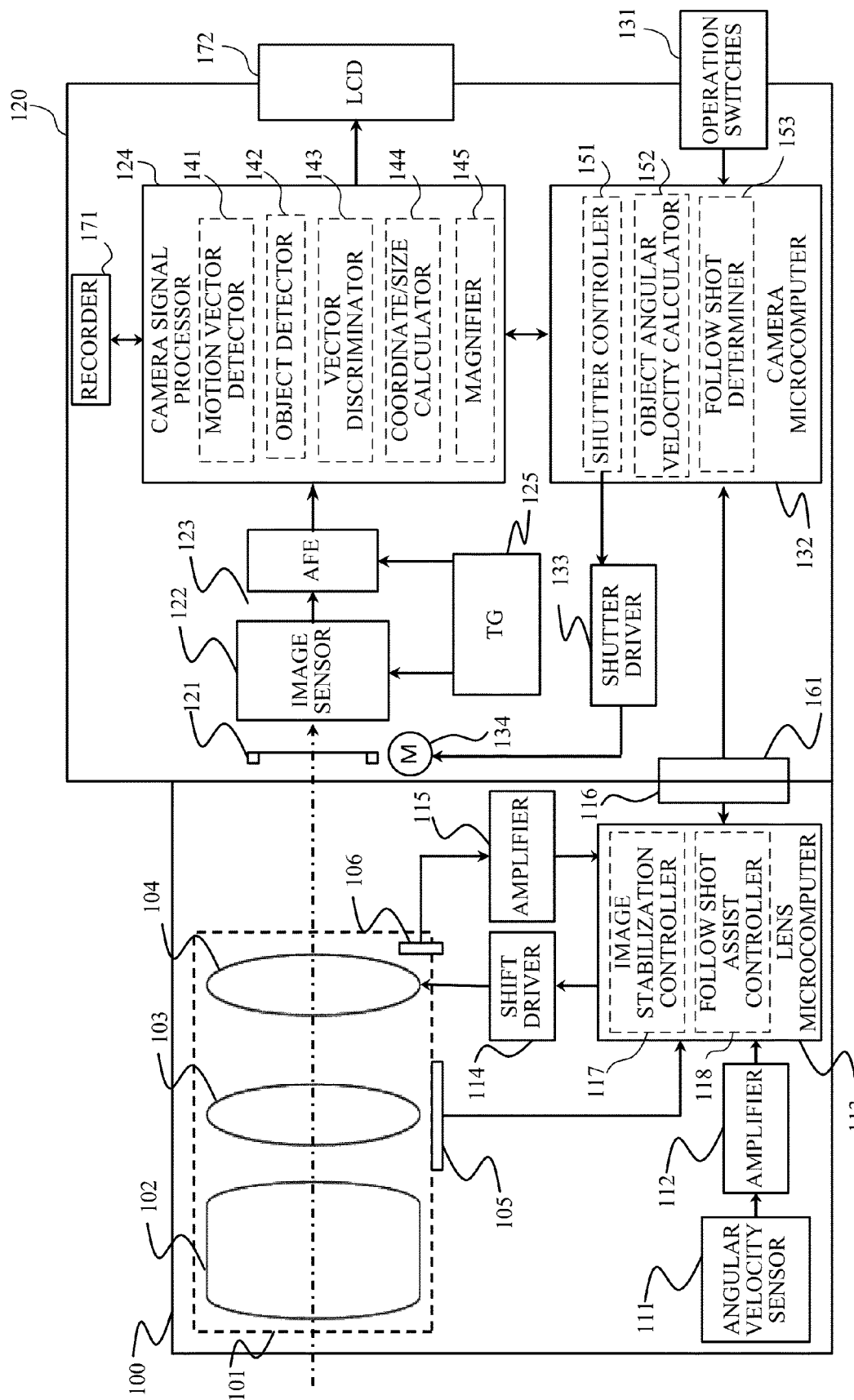
FIG. 3 illustrates a configuration of a lens-interchangeable camera system including the camera body of Embodiment 1.

FIG. 3 illustrates a configuration of a lens-interchangeable camera system constituted by an interchangeable lens 100 and an image capturing apparatus (hereinafter referred to as "a camera body") 120 that is a first embodiment (Embodiment 1) of the present invention. The interchangeable lens 100 is detachably attached to the camera body 120. The camera system is hereinafter also simply referred to as "a camera").

The interchangeable lens 100 has an image capturing optical system 101. The image capturing optical system 101 includes a main optical system 102 and a magnification-varying lens unit 103 that is moved in an optical axis direction in which an optical axis of the image capturing optical system 101 extends to vary a focal length (that is, vary a magnification) of the image capturing optical system 101. The image capturing optical system 101 further includes a shift lens unit 104 as a shift element that is movable (shiftable) in a shift direction orthogonal to the optical axis (in other words, in directions other than the optical axis direction).

The shift lens unit 104 is driven to be shifted in the shift direction as to optically correct or reduce an image blur caused by shaking of the camera (hereinafter referred to as "camera shaking") due to hand jiggling or the like. The drive (shift drive) of the shift lens unit 104 for correcting the image blur caused by the camera shaking is hereinafter referred to as "an image stabilization drive". Furthermore, when a user pans the camera (in other words, performs "camera panning") to perform a follow shot of a moving object, the shift lens unit 104 is driven to be shifted in the shift direction so as to assist the follow shot, that is, to perform a follow shot assist. The shift drive of the shift lens unit 104 for the follow shot assist is hereinafter referred to as "a follow shot assist drive". A control process of the follow shot assist drive will be described later.

The interchangeable lens 100 includes a zoom encoder 105 configured to detect a position of the magnification-varying lens unit 103, a shift driver 114 configured to perform the shift drive of the shift lens unit 104 and a shift position detector 106 configured to detect a position (shift position) of the shift lens unit 104 in the shift direction. The shift driver 114 is constituted by a shift actuator such as a voice coil motor and a drive circuit configured to drive the shift actuator.

The interchangeable lens 100 further includes an angular velocity sensor 111 as a motion detection unit configured to detect an angular velocity of the camera shaking or the camera panning. An output (angular velocity signal) of the angular velocity sensor 111 is amplified by an amplifier 112 to be input to a lens microcomputer 113. An output (shift position signal) of the shift position sensor 106 is amplified by an amplifier 115 to be input to the lens microcomputer 113.

The lens microcomputer 113 includes an image stabilization controller 117 configured to control the image stabilization drive and a follow shot assist controller 118 configured to control the follow shot assist drive. The image stabilization controller 117 controls the shift driver 114 depending on the angular velocity detected by the angular velocity sensor 111 and the shift position detected by the shift position sensor 106 to control the image stabilization drive of the shift lens unit 104. The image stabilization controller 117 thus performs an image stabilization control.

The lens microcomputer 113 receives, from a later-described camera microcomputer 132, shift control information that is information on a shift drive direction and a shift drive amount of the shift lens unit 104. The follow shot assist controller 118 controls the shift driver 114 depending on the shift control information and the shift position detected by the shift position sensor 106 to control the follow shot assist drive of the shift lens unit 104. The follow shot assist controller 118 thus performs a follow shot assist control.

The shift lens unit 104 is actually shifted in two shift directions that are orthogonal to each other, such as a horizontal (yaw) direction and a vertical (pitch) direction, and therefore the angular velocity sensor 111, the shift driver 114 and the shift position sensor 106 are provided for each shift direction. However, since the angular velocity sensors 111, the shift drivers 114 and the shift position sensors 106 for the respective shift directions have the same configurations, FIG. 3 illustrates the angular velocity sensor 111, the shift driver 114 and the shift position sensor 106 only in one shift direction.

The lens microcomputer 113 is further configured to control drives of a focus lens and an aperture stop, which are included in the image capturing optical system 101 but not illustrated.

The interchangeable lens 100 has a lens mount that is bayonet-coupled with a camera mount provided to the camera body 120. The lens mount is provided with a mount contact portion 116.

The camera body 120 includes a shutter 121 and an image sensor 122 such as a CMOS sensor. The shutter 121 controls an exposure amount of the image sensor 122. The image sensor 122 photoelectrically converts (captures) an object image formed by the image capturing optical system 101 to output an electric analog signal.

The camera body 120 further includes an analog signal processor 123, a camera signal processor 124 and a timing generator (TG) 125. The analog signal processor 123 is configured to convert the analog signal from the image sensor 122 into a digital signal. The camera signal processor 124 is configured to perform various image processes on the digital signal to produce a captured image (such as a live-view image as a motion image that is not to be recorded and a still image for recording). The image sensor 122 and the analog signal processor 123 constitute an image capturing unit configured to perform image capturing for producing the captured image. The TG 125 is configured to set times at which the image sensor 122 and the analog signal processor 123 operate. In the following description, the image capturing for acquiring the captured still image for recording is simply referred to as "an exposure".

The camera body 120 yet further includes operating switches 131 that include a power switch, a release switch (including an image capturing preparation switch and an image capturing start switch) and an image capturing mode selection switch to change over image capturing modes. The camera body 120 still further includes a camera microcomputer 132 configured to control operations of the entire camera system. The image capturing modes include a follow shot assist mode in which the follow shot assist drive of the shift lens unit 104 is performed and a normal mode in which the follow shot assist drive is not performed. The camera microcomputer 132 includes a shutter controller 151 configured to control, through a shutter driver 133, drive of a shutter motor 134 that causes the shutter 121 to perform a shutter operation.

The camera body 120 yet still further includes a recorder 171 configured to record the captured image for recording to a recording medium such as a semiconductor memory or an optical disc and a display unit 172 such as a liquid crystal panel configured to display the live-view image and the captured image for recording. The display unit 172 is hereinafter referred to as "an LCD".

The camera body 120 has a camera mount with which the interchangeable lens 100 is bayonet-coupled. The camera mount is provided with a mount contact portion 161 that is electrically connected to the mount contact portion 116 of the lens mount. Through the mount contact portions 161 and 116, the camera microcomputer 132 performs communication (for example, serial communication) with the lens microcomputer 113 and supplies power to the interchangeable lens 100.

The camera signal processor 124 includes a motion vector detector 141, an object detector 142, a vector discriminator 143, a coordinate/size calculator 144 and a magnifier 145. The camera signal processor 124 corresponds to an image processing apparatus, the vector discriminator 143 corresponds to a vector acquisition unit 143, and the coordinate/size calculator 144 and the magnifier 145 correspond to a processing unit.

The motion vector detector 141 detects multiple motion vectors at multiple positions (coordinates) in the live-view image. The object detector 142 detects, using a function of recognizing a specific object such as a person or a face, the specific object in the live-view image.

The vector discriminator 143 is configured to discriminate the multiple motion vectors detected by the motion vector detector 141 to separate them into main object motion vectors corresponding to a main object, background motion vectors corresponding to a background object and other motion vectors corresponding to other objects than the main and background objects. That is, the vector discriminator 143 is configured to acquire, from the multiple motion vectors, the main object motion vectors and the background motion vectors. Although described later, the vector discriminator 143 uses a variable threshold when discriminating the main object motion vectors, the background motion vectors and the other motion vectors.

The magnifier 145 is configured to perform a magnification display process for magnifying a partial area of the captured still image acquired by still image capturing with the follow shot assist drive of the shift lens unit 104 (that is, with the follow shot assist) and for causing the LCD 172 to display the magnified partial area. The still image acquired by still image capturing with the follow shot assist is hereinafter referred to as "a follow shot assist image". The partial area of the follow shot assist image is a main object area where the main object is captured and a background area where the background object is captured. The term "magnifying the partial area" means that magnifying the partial area as compared with a case where the LCD 172 displays the entire follow shot assist image.

The coordinate/size calculator 144 is configured to set sizes of the main object area and the background area to be magnified by the magnifier 145 and set a magnification center that is a center position (center coordinates) around which the magnifier 145 magnifies the main object or background area.

The camera microcomputer 132 includes a shutter controller 151, an object angular velocity calculator 152 and a follow shot determiner 153. The shutter controller 151 is configured to control, through the shutter driver 133, the drive of the shutter 121 (shutter motor 134). The object angular velocity calculator 152 is configured to calculate an angular velocity of the main object (actually, of a main object image on an image plane).

In FIG. 3, when the power switch in the operating switches 131 is operated by the user and thereby the camera body 120 is powered on, the camera microcomputer 132 detecting that state change supplies power to each part in the camera body 120 and performs initial settings of the camera body 120. The camera microcomputer 132 supplies the power also to the interchangeable lens 100. The lens microcomputer 113 performs initial settings of the interchangeable lens 100. The camera microcomputer 132 and the lens microcomputer 113 start communication therebetween. The camera microcomputer 132 sends to the lens microcomputer 113 information on a state of the camera body 120 and on image capturing settings, such as setting/non-setting of the follow shot assist mode. The lens microcomputer 113 sends, to the camera microcomputer 132, optical information on, for example, the focal length of the image capturing optical system 101

In the normal image capturing mode in which the follow shot assist mode is not set, the image stabilization controller 117 in the lens microcomputer 113 controls, on a basis of the angular velocity of the camera shaking detected by the angular velocity sensor 111, the image stabilization drive of the shift lens unit 104. Thereby, an image stabilization is performed. On the other hand, in the follow shot assist mode, the follow shot assist controller 118 in the lens microcomputer 113 controls, on a basis of the above-described shift control information from the camera microcomputer 132, the follow shot assist drive of the shift lens unit 104. Thereby, a follow shot assist is performed.

Figure 4:
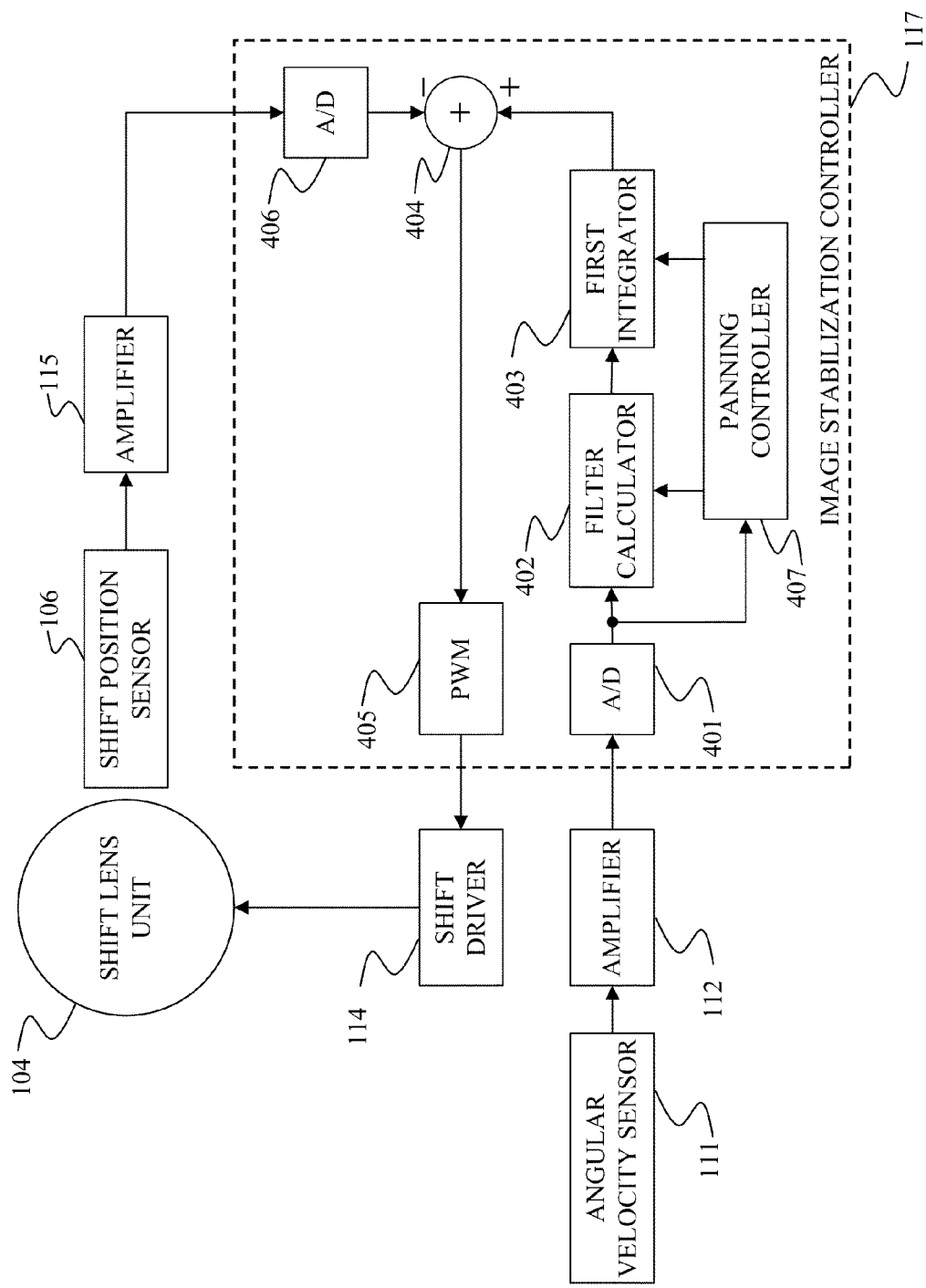
FIG. 4 is a block diagram illustrating a configuration of an image stabilization system in the camera system in Embodiment 1.

FIG. 4 illustrates a configuration of an image stabilization system including the image stabilization controller 117. In FIG. 4, constituent elements common to those in FIG. 3 are denoted by the same reference numerals as those in FIG. 3. As described above, although two image stabilization systems are actually provided for shifting the shift lens unit 104 in the yaw and pitch directions, FIG. 4 illustrates only the configuration of one image stabilization system because the two image stabilization systems have mutually identical configurations.

An angular velocity A/D converter 401 is configured to convert the angular velocity signal (analog signal) output from the angular velocity sensor 111 (amplifier 112) into angular velocity data as a digital signal to output the angular velocity data to a filter calculator 402. The angular velocity A/D converter 401 samples the angular velocity data at a frequency of about 1 to 10 kHz corresponding to the hand jiggling.

The filter calculator 402 is constituted by a high-pass filter (HPF) and is configured to remove an offset component from the angular velocity data and to change a cutoff frequency of the HPF in response to an instruction from a later-described panning controller 407. A first integrator 403 is configured to convert the angular velocity data into angular displacement data, in order to create target position data indicating a target shift position of the shift lens unit 104.

A shift position A/D converter 406 is configured to convert the shift position signal (analog signal) output from the shift position sensor 106 (amplifier 115) into shift position data as a digital signal. A first adder 404 is configured to subtract the target position data of the shift lens unit 104 from the shift position data currently acquired to calculate a drive amount data of the shift lens unit 104.

A PWM outputter 405 is configured to output the calculated drive amount data to the shift driver 114. The shift driver 114 is configured to drive the shift actuator on a basis of the drive amount data to shift the shift lens unit 104 to the target shift position.

The panning controller 407 is configured to perform a panning control. Specifically, the panning controller 407 determines, from the angular velocity data from the angular velocity sensor 111, whether or not the camera panning is performed. If the camera panning is performed, the panning controller 407 changes the cutoff frequency of the filter calculator (HPF) 402 and adjusts the output (angular displacement data) from the first integrator 403.

Figure 5:
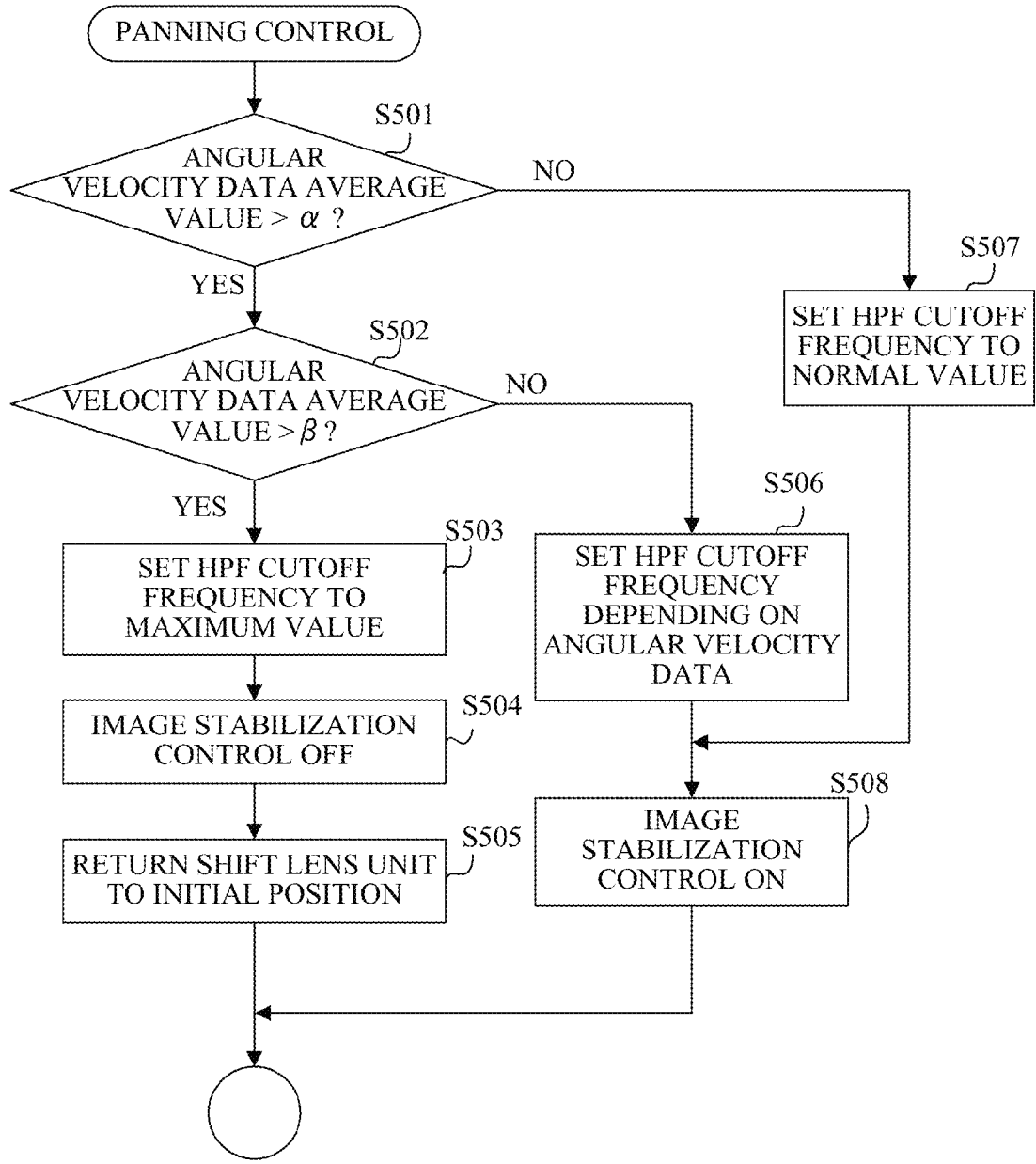
FIG. 5 is a flowchart illustrating a panning control in the camera body of Embodiment 1.

FIG. 5 illustrates an example of the panning control performed by the panning controller 407. The panning controller 407 (that is, the lens microcomputer 113) executes this panning control according to a panning process program as a computer program.

At step S501, the panning controller 407 determines whether or not an average value of the angular velocity data sampled multiple times from the angular velocity A/D converter 401 is larger (faster) than a predetermined value $\alpha$. The average value of the angular velocity data is hereinafter referred to as "an average angular velocity".

If the average angular velocity is equal to or smaller (slower) than the predetermined value $\alpha$, the panning controller 407 determines that the camera panning is not performed and proceeds to step S507. If the average angular velocity is larger than the predetermined value $\alpha$, the panning controller 407 proceeds to step S502 to determine whether or not the average angular velocity is larger than another predetermined value $\beta$ (>$\alpha$). If the average angular velocity is equal to or smaller than the predetermined value $\beta$, the panning controller 407 determines that a slow camera panning is performed and proceeds to step S506. If the average angular velocity is larger than the predetermined value $\beta$, the panning controller 407 determines that a fast camera panning is performed and proceeds to step S503.

At step S503, the panning controller 407 sets the cutoff frequency of the filter calculator (HPF) 402 to its maximum value. At step S504, the panning controller 407 turns the image stabilization control off (that is, turns it into a state of not being performed). A reason for turning the image stabilization control off when the fast camera panning is performed is as follows. If the fast camera panning is treated as hand jiggling and the shift lens unit 104 is shifted depending thereon, the live-view image is significantly moved when the shift lens unit 104 reaches its shift end, which gives the user a feeling of strangeness. Turning the image stabilization control off can prevent this problem from occurring. In addition, the fast camera panning causes a large movement of the live-view image, so that the image blur due to hand jiggling hardly gives the user a feeling of strangeness. Thus, the panning controller 407 having set the cutoff frequency of the HPF to the maximum value gradually stops the shift lens unit 104 at next step, thereby avoiding giving the user a feeling of strangeness caused by the image blur due to hand jiggling abruptly appearing with the turning off of the image stabilization control.

The panning controller 407 having turned the image stabilization control off gradually varies at step S505 the output of the first integrator 403 from current angular displacement data to initial position data to gradually return the shift lens unit 104 to its initial position. The initial position is a position where an optical axis of the shift lens unit 104 coincides with the optical axis of the image capturing optical system 101.

The panning controller 407 having determined that the slow camera panning is performed sets at step S506 the cutoff frequency of the filter calculator (HPF) 402 depending on the angular velocity data. This is because, since the image blur due to hand jiggling is noticeable when the slow camera panning is performed, the image blur is necessary to be corrected. The panning controller 407 sets the cutoff frequency such that the image blur due to hand jiggling is corrected while making it possible that the live-view image naturally follows the camera panning. Thereafter, the panning controller 407 proceeds to step S508 to turn on the image stabilization control (that is, to turn it into a state of being performed).

The panning controller 407 having determined that the average angular velocity is smaller than the predetermined value $\alpha$ (that is, the camera panning is not performed) and thereby proceeded to step S507 sets the cutoff frequency of the filter calculator (HPF) 402 to a normal value. Then, the panning controller 407 proceeds to step S508 to turn on the image stabilization control.

Figure 7:
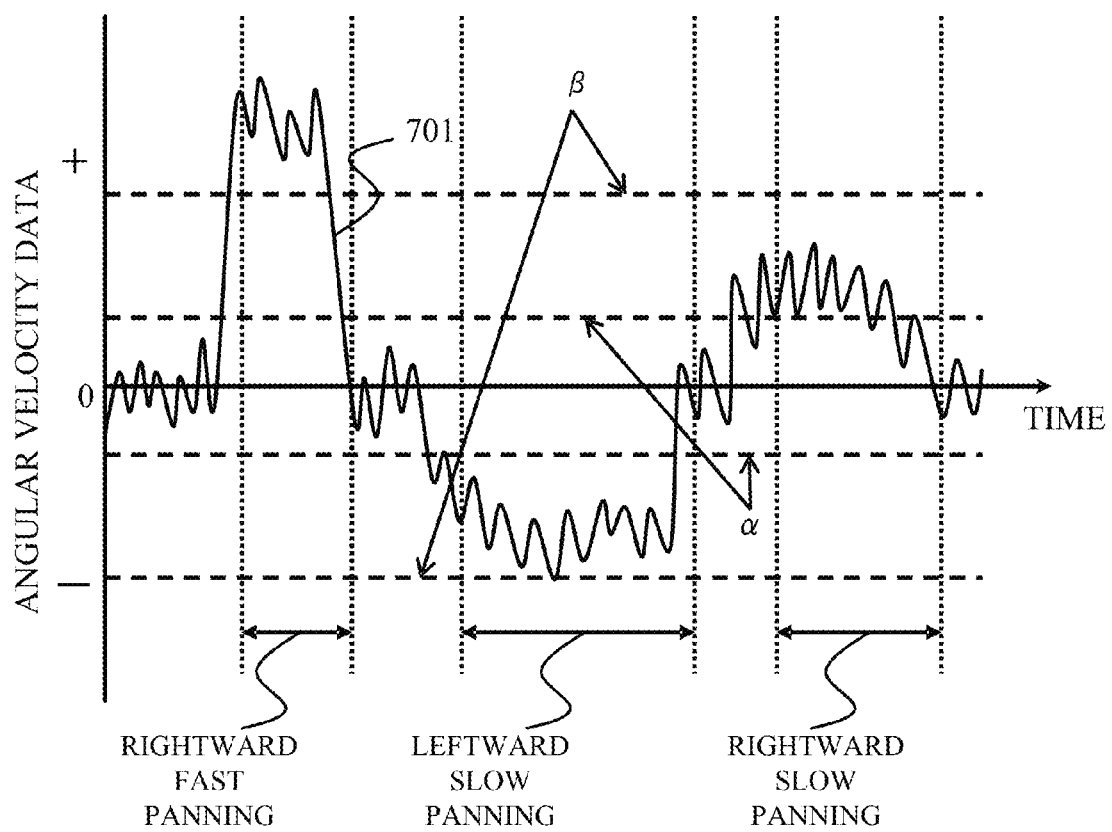
FIG. 7 illustrates a panning determination threshold in Embodiment 1.

FIG. 7 illustrates an example of a relation between angular velocity data 701, which is sampled when the camera is panned in right and left directions, and the predetermined values $\alpha$ and $\beta$. Positive angular velocity data indicates a rightward camera panning, and negative angular velocity data indicates a leftward camera panning. In the example of FIG. 7, a rightward fast (steep) camera panning, a leftward slow camera panning and a rightward slow camera panning are detected.

As understood from FIG. 7, during the camera panning, the angular velocity data significantly differs from its initial value (0). Therefore, integrating this angular velocity data by the first integrator 403 for calculating the target position data of the shift lens unit 104 makes the output of the first integrator 403 extremely large due to a DC-like offset component, which makes the shift lens unit 104 uncontrollable. Therefore, when the camera panning is detected, a high cutoff frequency of the HPF is necessary to be set so as to cut the DC-like offset component. Since a fast camera panning prominently causes such a state, a higher cutoff frequency is desirable to be set for the fast camera panning so as not to increase the output of the first integrator 403.

The above-described panning control enables providing a captured image giving little feeling of strangeness to the user.

In response to setting of the follow shot assist mode by an operation of the image capturing selection switch in the operation switches 131 illustrated in FIG. 3, the camera microcomputer 132 starts the follow shot assist control and sends information on the setting of the follow shot assist mode to the lens microcomputer 113. The lens microcomputer 113 thus enters into the follow shot assist mode.

In the follow shot assist mode, the motion vector detector 141 in the camera signal processor 124 detects motion vectors between consecutive frame images of the live-view image to output the motion vectors to the camera microcomputer 132. Along with the detection of the motion vectors, the camera microcomputer 132 receives, from the lens microcomputer 113, angular velocity data (first motion information) detected by the angular velocity sensor 111, amplified by the amplifier 112 and further A/D-converted in the interchangeable lens 100.

As described above, the motion vectors output from the motion vector detector 141 during the follow shot include the main object motion vectors corresponding to the main object and the background motion vectors corresponding to the background object. Among these motion vectors, each one indicating a smaller motion amount than that indicated by the other is the main object motion vector (second motion information). The main object motion vector indicates, as mentioned above, a displacement (motion) of the main object image on the image plane, that is, on the image sensor 122.

On the other hand, the angular velocity data from the interchangeable lens 100 corresponds to a panning speed (follow shot speed) of the camera. Therefore, calculating a difference between this angular velocity data and an angular velocity calculated from a displacement amount of the main object image on the image plane in one frame period and from the focal length of the image capturing optical system 101 provides an angular velocity of the main object relative to the camera. This angular velocity of the main object relative to the camera is hereinafter referred to as "a relative object angular velocity".

The object angular velocity calculator 152 calculates (acquires) this relative object angular velocity at each time of producing one frame image, that is, at a frame period. The camera microcomputer 132 sends data of the calculated relative object angular velocity to the lens microcomputer 113.

Figure 6:
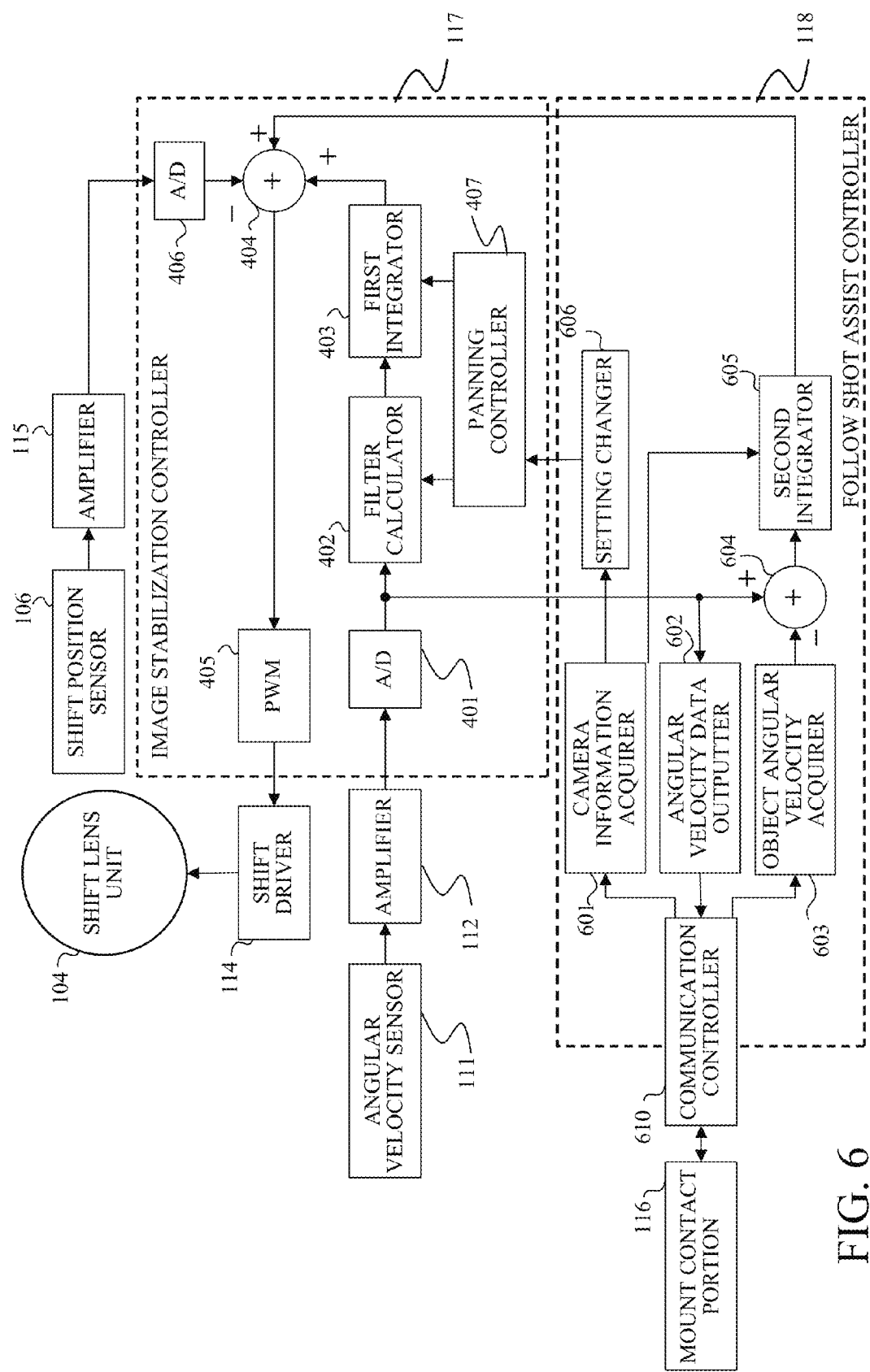
FIG. 6 is a block diagram illustrating a configuration of a shift drive control system in the camera system in Embodiment 1 in a follow shot assist mode.

FIG. 6 illustrates a configuration of a shift drive control system configured to perform a shift drive control of the shift lens unit 104 in the follow shot assist mode. In FIG. 6, constituent elements common to those illustrated in FIGS. 3 and 4 are denoted by the same reference numerals as those in FIGS. 3 and 4, and their description will be omitted.

The follow shot controller 118 includes a camera information acquirer 601, an angular velocity data outputter 602, an object angular velocity acquirer 603 as a second velocity acquiring unit, a second adder 604, a second integrator 605, a setting changer 606 and a communication controller 610.

The camera information acquirer 601 is configured to acquire mode setting information indicating setting of the follow shot assist mode and release information indicating that the release switch is operated to instruct image capturing. The angular velocity outputter 602 is configured to sample the angular velocity data at a predetermined period.

The object angular velocity acquirer 603 is configured to acquire data of the relative object angular velocity from the camera microcomputer 132. The second adder 604 is configured to calculate a difference between the angular velocity data from the angular velocity sensor 111 and the data of the relative object angular velocity from the object angular velocity acquirer 603. The second integrator 605 is configured to perform an integration operation on the difference calculated by the second adder 604 only for a predetermined period of time (exposure period of time). The setting changer 606 is configured to change of setting of the panning controller 407 depending on the mode information received from the camera information acquirer 601. The communication controller 610 performs bidirectional communication with the camera microcomputer 132.

The follow shot determiner 153 in the camera microcomputer 132 is configured to integrate the angular velocity data received from the lens microcomputer 113 to hold the integration result. This enables, when the user performs the follow shot, acquiring an angular change (hereinafter referred to as "a follow shot angle") from a predetermined start time.

In response to setting of the follow shot assist mode by the operation of the image capturing selection switch in the operation switches 131, the camera information acquirer 601 reads the mode setting information indicating the setting of the follow shot assist mode from the communication controller 610 and informs the setting thereof to the setting changer 606.

The setting changer 606 performs a setting change of the panning controller 407 in response to the mode setting information indicating the setting of the follow shot assist mode. Specifically, in order to facilitate a fast camera panning by the user, the setting changer 606 changes the predetermined values α and β in the panning controller 407. Furthermore, in order to send the shift position data from the shift position sensor 106 to the camera microcomputer 132, the follow shot assist controller 118 sends the shift position data to the communication controller 610.

The object angular velocity acquirer 603 takes in the relative object angular velocity data sent from the camera microcomputer 132 to the lens microcomputer 113. The second adder 604 calculates the difference between the angular velocity data from the angular velocity sensor 111 and the relative object angular velocity data and sends the calculated difference to the second integrator 605. The second integrator 605 starts, in response to the release information from the camera information acquirer 601, the integration operation of the calculated difference within the exposure period of time. In a period of time other than the exposure period of time, the second integrator 605 outputs a value causing the shift lens unit 104 to be located at the initial position.

If at the end of the exposure period of time the shift lens unit 104 shifts from its position at that time to the initial position in a short time, this is not a problem. That is, since a period of time immediately after the end of the exposure period of time is used for reading the analog signal from the image sensor 122 and thereby no live-view image is displayed on the LCD 172, a movement of the live-view image due to the shift of the shift lens unit 104 is not a problem.

The first adder 404 adds the output of the second integrator 605 to the output of the first integrator 403 and subtracts, from the addition result, the shift position data from the shift position sensor 106. Thereby, the drive amount data of the shift lens unit 104 is calculated.

In response to the follow shot with the fast camera panning by the user while the follow shot assist mode is set, the panning controller 407 immediately starts the panning control and turns off the image stabilization control as described at step S504 in FIG. 5. The shift lens unit 104 subjected to the panning control corrects the displacement amount of the main object image on the image plane. The displacement amount corresponds to a difference between the angular velocity due to the camera panning and the relative object angular velocity corresponding to a moving speed (angular velocity) of the main object with respect to the camera. Consequently, a difference between the panning speed of the camera and the moving speed of the main object, which causes a failure of the follow shot, is cancelled out by the shift drive of the shift lens unit 104, thereby making the follow shot succeed.

Figure 2:
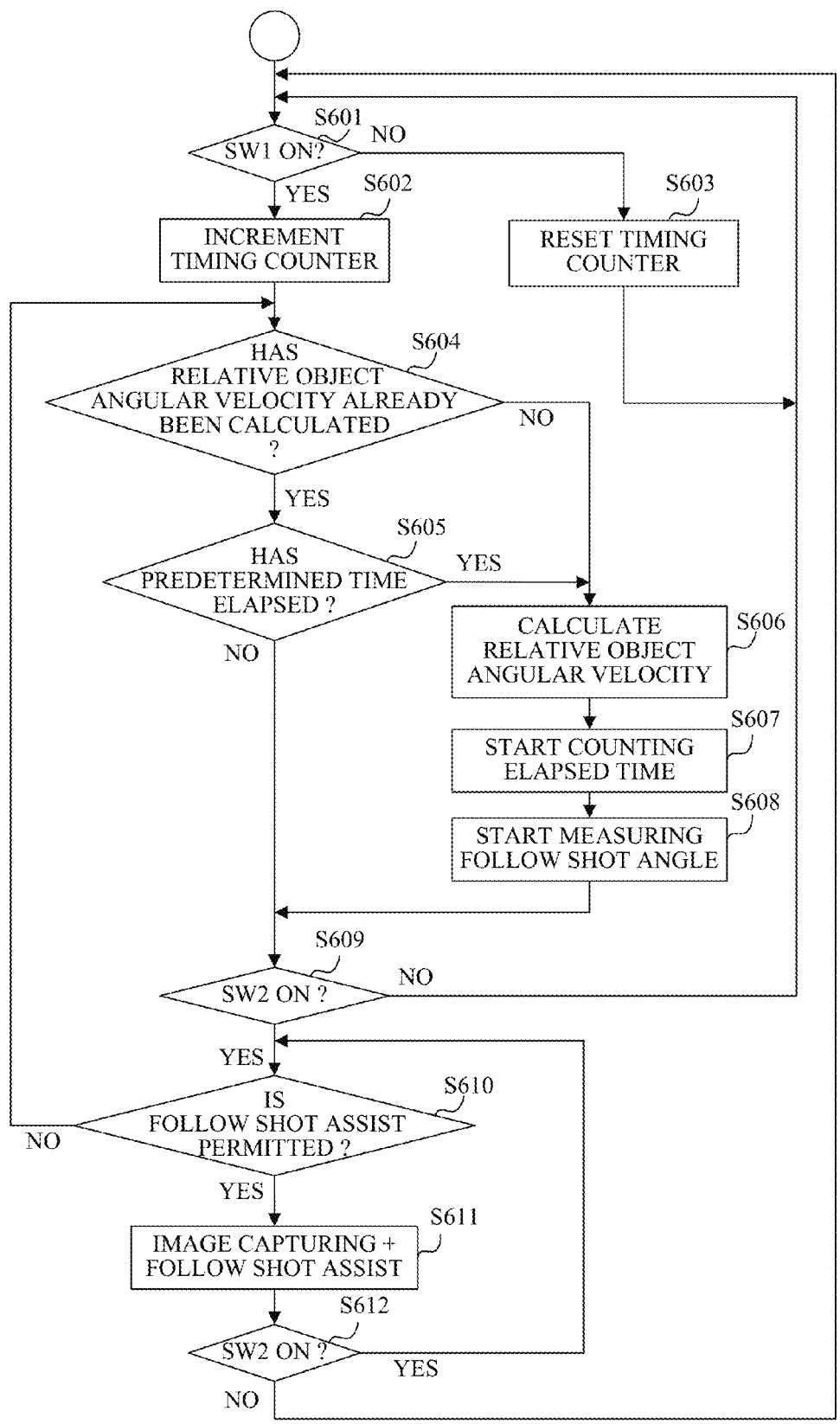
FIG. 2 is a flowchart illustrating a basic flow of a follow shot assist image capturing process performed in Embodiment 1.

A flowchart of FIG. 2 illustrates a follow shot assist image capturing process performed by the camera microcomputer 132 in the follow shot assist mode. The camera microcomputer 132 executes this process according to a follow shot assist image capturing process program as a computer program. The user follows the moving object with the camera panning.

At step S601, the camera microcomputer 132 determines whether or not the release switch has been half-pressed (that is, whether or not SW1 is ON). If SW1 is ON, the camera microcomputer 132 proceeds to step S602 to increment a timing counter and then proceeds to step S604. If SW1 is not ON, the camera microcomputer 132 proceeds to step S603 to reset the timing counter and then returns to step S601.

At step S604, the camera microcomputer 132 checks whether or not the relative object angular velocity has already been calculated by the object angular velocity calculator 152. If the relative object angular velocity has already been calculated, the camera microcomputer 132 proceeds to step S605 to check whether or not the timing counter has reached a predetermined time T. If the relative object angular velocity has not yet been calculated or if the relative object angular velocity has already been calculated but the timing counter has reached the predetermined time T, the camera microcomputer 132 proceeds to step S606.

At step S606, the camera microcomputer 132 causes the object angular velocity calculator 152 to calculate the relative object angular velocity. That is, before an exposure started in response to SW2 (described later) being ON, the relative object angular velocity is calculated by the object angular velocity calculator 152. The camera microcomputer 132 sends data of this relative object angular velocity to the lens microcomputer 113 (follow shot assist controller 118). A reason for recalculating the relative object angular velocity when the timing counter has reached the predetermined time T is to consider a possibility that the moving speed of the main object may change before the timing counter reaches to the predetermined time T. The camera microcomputer 132 sends, at each time when the relative object angular velocity is calculated, data thereof to the lens microcomputer 113.

On the other hand, if the timing counter has not yet reached the predetermined time T at step S605, the camera microcomputer 132 proceeds to step S609.

At step S607 after step S606, the camera microcomputer 132 starts counting an elapsed time (hereinafter referred to as "a follow shot elapsed time") after the start of the follow shot assist. Furthermore, at step S608, the camera microcomputer 132 resets the follow shot angle that is being integrated by the follow shot determiner 153 and starts measuring a new follow shot angle after the start of the follow shot assist. Then, the camera microcomputer 132 proceeds to step S609.

At step S609, the camera microcomputer 132 determines whether or not the release switch has been full-pressed (that is, whether or not SW2 is ON). If SW2 is not ON, the camera microcomputer 132 returns to step S601. On the other hand, if SW2 is ON, the camera microcomputer 132 proceeds to step S610 to perform a follow shot determination (described later) for determining whether or not the follow shot assist is permitted. If the follow shot assist is permitted, the camera microcomputer 132 proceeds to step S611.

At step S611, the camera microcomputer 132 causes the shutter 121 to open, through the shutter controller 151, to start the exposure of the image sensor 122. The camera microcomputer 132 further causes the lens microcomputer 113 (follow shot assist controller 118) to control the follow shot assist drive of the shift lens unit 104 depending on the relative object angular velocity. Thus, the follow shot assist for correcting the displacement amount of the main object image on the image plane is performed. Then, the camera microcomputer 132 proceeds to step S612.

On the other hand, if the follow shot assist is not permitted at step S610, the camera microcomputer 132 returns to step S604. When the follow shot assist is not permitted, the camera microcomputer 132 may display, on the LCD 172, warning information indicating that the follow shot assist is not performed.

At step S612, the camera microcomputer 132 again determines whether or not SW2 is ON. If SW2 is ON, the camera microcomputer 132 returns to step S610 to perform, for next image capturing (that is, for acquiring a next captured image in continuous image capturing), the follow shot determination and the exposure. On the other hand, if SW2 is not ON, the camera microcomputer 132 returns to step S601.

Figure 1:
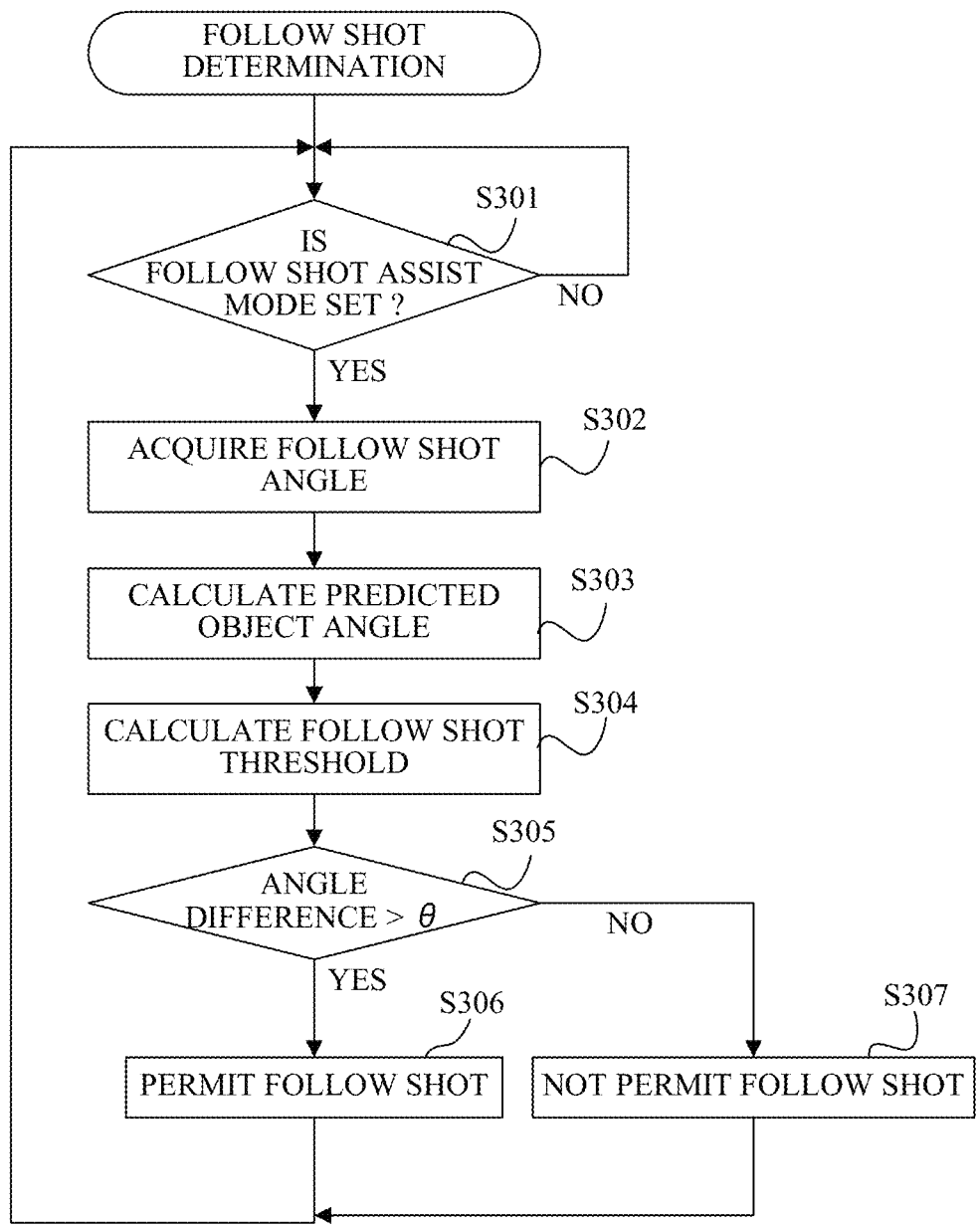
FIG. 1 is a flowchart illustrating a follow shot determination process performed in a camera body that is Embodiment 1 of the present invention.

FIG. 1 illustrates a process for the follow shot determination performed by the camera microcomputer 132 (follow shot determiner 153) at step S610 in FIG. 6.

At step S301, the camera microcomputer 132 determines whether or not the follow shot assist mode is set (that is, whether or not the follow shot determination is necessary). If the follow shot assist mode is set, the camera microcomputer 132 proceeds to step S302, and otherwise repeats the determination at step S301.

At step S302, the camera microcomputer 132 acquires the follow shot angle and then proceeds to step S303. At step S303, the camera microcomputer 132 calculates, from the relative object angular velocity and the above-described follow shot elapsed time, a predicted object angle that is a movement angle of the main object, in other words, an object angle when the main object is assumed to keep moving at its angular velocity.

At step S304, the camera microcomputer 132 calculates a follow shot threshold θ as a threshold of the object angle used for the follow shot determination. The camera microcomputer 132 calculates a smaller follow shot threshold θ as the focal length of the image capturing optical system 101 increases (that is, as an angle of view thereof decreases). In this description, the follow shot threshold θ is the angle of view calculated from the focal length.

Next, at step S305, the camera microcomputer 132 compares an absolute value of a difference (hereinafter referred to as "an angle difference") between the predicted object angle and the follow shot angle with the follow shot threshold θ. If the angle difference is larger than the follow shot threshold θ, the camera microcomputer 132 proceeds to step S306, and otherwise proceeds to step S307.

At step S306, the camera microcomputer 132 permits the follow shot assist. On the other hand, at step S307, the camera microcomputer 132 does not permit the follow shot assist. The camera microcomputer 132 sends these follow shot assist permission/non-permission determination results to the lens microcomputer 113. The sending of the follow shot assist non-permission determination result is information instructing the lens microcomputer 113 to release the follow shot assist mode.

Figure 9:
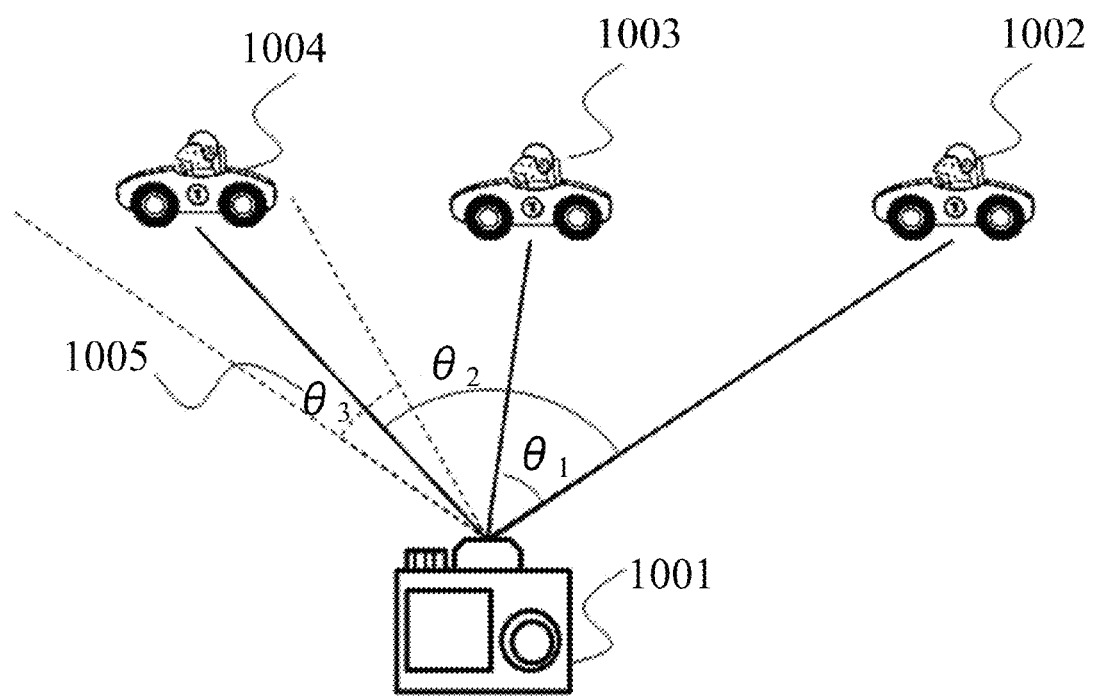
FIG. 9 conceptually illustrates a follow shot determination in Embodiment 1.

FIG. 9 conceptually illustrates the follow shot determination performed by the follow shot determiner 153. Reference numeral 1001 denotes a camera, and 1002 a position of a main object at a time when the relative object angular velocity is calculated. Reference numeral 1003 denotes a position of the main object when assuming that it moves from the position 1002 at the calculated relative object angular velocity. An object angle from the position 1002 to the position 1003 is defined as a predicted object angle θ1.

Reference numeral 1004 denotes an actual position of the main object calculated by the angular velocity data from the angular velocity sensor 111. An object angle from the position 1002 to the position 1004 is defined as a follow shot angle θ2.

Reference numeral 1005 denotes an angle of view of the image capturing optical system 101 at an exposure, which corresponds to a follow shot threshold θ3. The follow shot controller 153 makes, when an angel difference |θ1−θ2| is larger than θ3, a determination (follow shot assist permission determination) to permit the follow shot assist.

Figure 10:
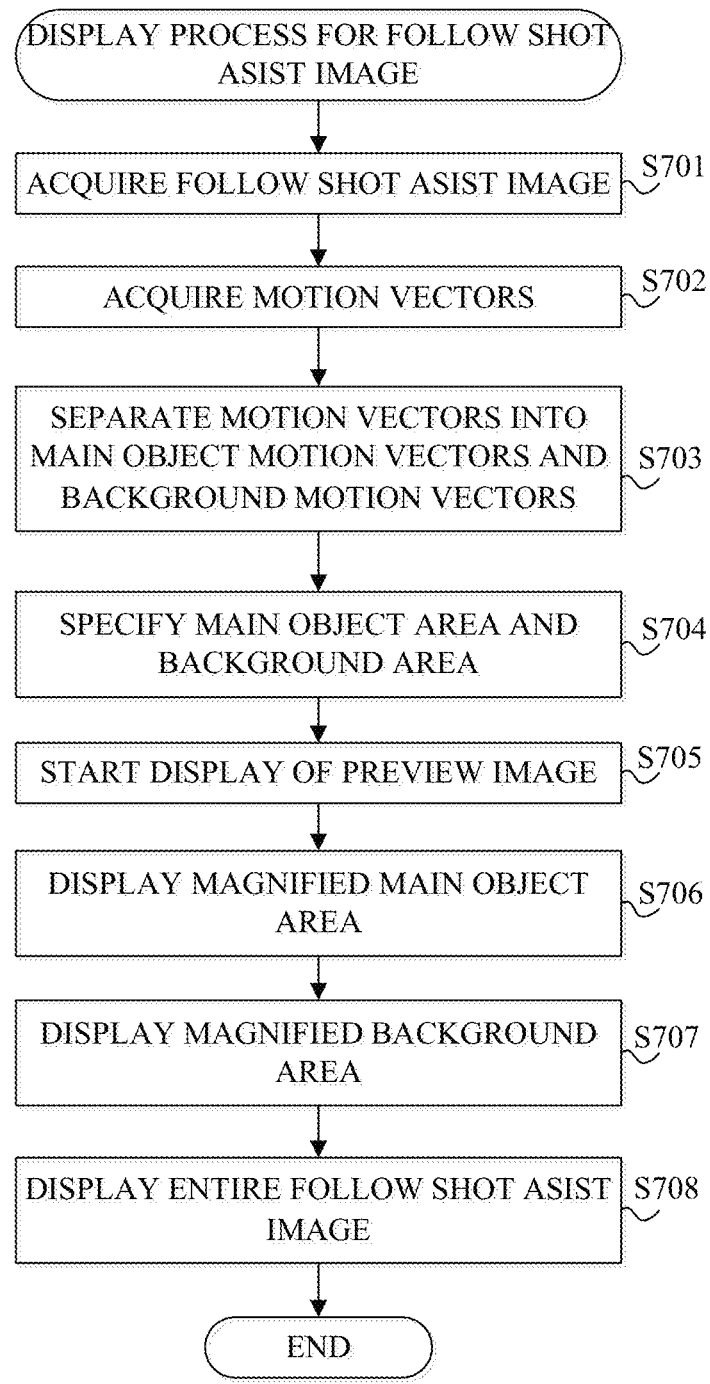
FIG. 10 is a flowchart illustrating a follow shot assist image display process commonly performed by camera bodies that are Embodiments 1 to 5 of the present invention.

A flowchart of FIG. 10 illustrates a display process that the camera signal processor 124 (including the vector discriminator 143, the coordinate/size calculator 144 and the magnifier 145) performs on a still image (follow shot assist image) acquired by image capturing with the follow shot assist.

The camera signal processor 124 constituted by an image processing computer executes this process according to an image processing program as a computer program.

At step S701, the camera signal processor 124 takes in the follow shot assist image acquired by image capturing for recording as a target image for the display process.

Next, at step S702, the camera signal processor 124 acquires motion vectors detected by the motion vector detector 141 at multiple coordinates in a live-view image produced immediately before start of the image capturing for recording during camera panning.

Next, at step S703, the camera signal processor 124 discriminates the motion vectors acquired at the multiple coordinates at step S702 to separate them into the above-described main object motion vectors and background motion vectors.

Next, at step S704, the camera signal processor 124 sets (specifies), using the separated main object motion vectors and background motion vectors, the above-described main object area and background area in the follow shot assist image. A method for setting these areas at step S704 will be described later in detail.

Next, at step S705, the camera signal processor 124 starts displaying the follow shot assist image as a preview image on the LCD 172. The preview image is displayed for enabling checking an image quality of the follow shot assist image before its recording. In displaying the preview image (follow shot assist image), first at step S706, the camera signal processor 124 performs a magnification display process for magnifying the main object area in the follow shot assist image as compared with a case where the LCD 172 displays the entire follow shot assist image. The camera signal processor 124 proceeds to step S707 in response to an elapse of a predetermined period of time after start of the display of the magnified main object area or in response to an operation of a display changeover switch included in the operation switches 131.

At step S707, the camera signal processor 124 performs another magnification display process for magnifying the background area in the follow shot assist image as compared with the case where the LCD 172 displays the entire follow shot assist image. The camera signal processor 124 proceeds to step S708 in response to an elapse of the predetermined period of time after start of the display of the magnified background area or in response to the operation of the display changeover switch.

At step S708, the camera signal processor 124 displays the entire follow shot assist image as a normal preview image on the LCD 172.

Figure 12:
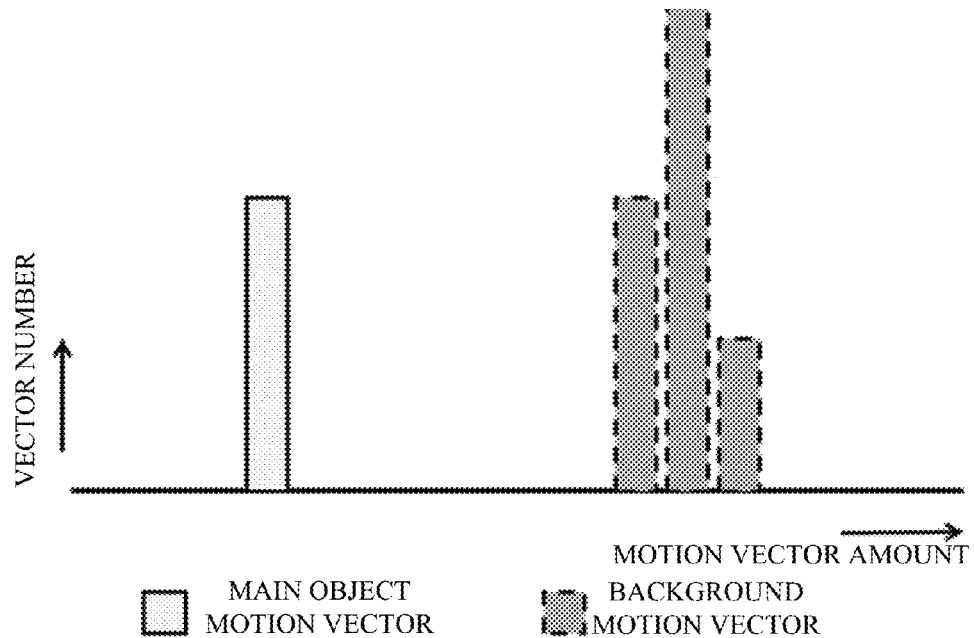
FIG. 12 illustrates a histogram of main object motion vectors and background motion vectors in Embodiment 1.

FIG. 12 illustrates a histogram produced by the vector discriminator 143 to discriminate and separate the main object motion vectors and the background motion vectors from each other at step S703 in FIG. 10. In FIG. 12, a horizontal axis indicates magnifications (motion vector amounts) of the multiple motion vectors detected at the multiple coordinates, and a vertical axis indicates numbers of motion vectors having the same magnification among the multiple motion vectors.

The camera panning performed by the user to follow the moving main object reduces the main object image on the image plane, so that the motion vector amounts corresponding to the main object are 0 or near 0. On the other hand, the camera panning largely moves the camera with respect to the background object, so that the background object image is largely moved on the image plane. Thus, the motion vector amounts corresponding to the background object are large. Accordingly, among the multiple motion vectors detected at the multiple coordinates, the motion vectors having relatively small vector amounts (0 or near 0) can be determined as the main object motion vectors, and the motion vectors having relatively large vector amounts can be determined as the background motion vectors.

Figure 13:
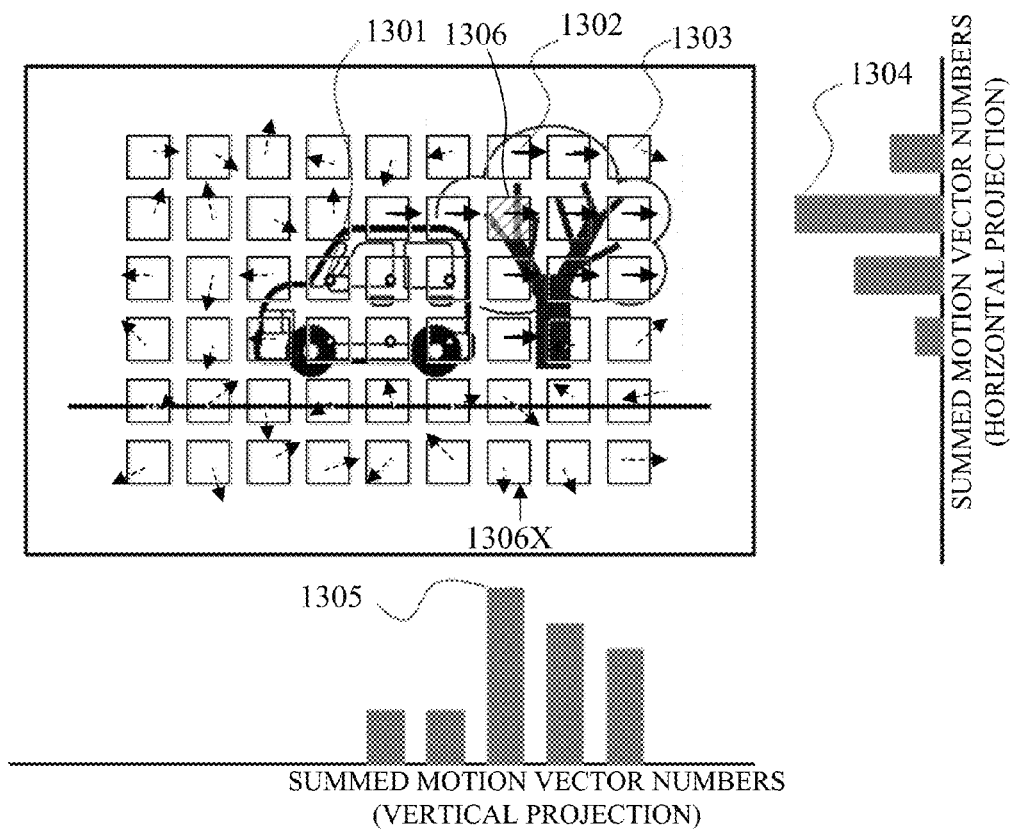
FIG. 13 illustrates a method for setting a magnification center of a background area in Embodiment 1.

FIG. 13 illustrates a method by which the coordinate/size calculator 144 sets (specifies) the main object area and the background area at step S704 in FIG. 10. The method for setting the background area will herein be described.

In FIG. 13, reference numeral 1301 denotes main object motion vectors determined by the vector discriminator 143 in an area where an image of a car that is a main object exists in a live-view image (motion image) produced during the camera panning. The main object motion vectors 1301 have motion vector amounts near 0. Reference numeral 1302 denotes background motion vectors determined by the vector discriminator 143 in an area where an image of a tree that is a background object exists in the above live-view image. Reference numeral 1303 denotes erroneously detected motion vectors determined by the vector discriminator 143 as being neither the main object motion vector nor the background motion vector.

A right part of FIG. 13 illustrates a graph 1304 showing summed motion vector numbers of the background motion vectors 1302 horizontally projected at respective vertical coordinates. A lower part of FIG. 13 illustrates a graph 1305 showing summed motion vector numbers of the background motion vectors 1302 vertically projected at respective horizontal coordinates. The coordinate/size calculator 144 performs such a projection summing process on the background motion vectors to detect a peak horizontal coordinate 1306X and a peak vertical coordinate 1306Y respectively as coordinates (positions) where the summed vector numbers of the background motion vectors 1302 are maximum in the horizontal and vertical directions.

The coordinate/size calculator 144 acquires peak coordinates 1306 whose horizontal coordinate and vertical coordinate component are the peak horizontal coordinate 1306X and the peak vertical coordinate 1306Y and sets, in the follow shot assist image, coordinates corresponding to the peak coordinates 1306 as a center of the background area. The center of the background area is hereinafter referred to as "a background center". The coordinate/size calculator 144 further sets, in the follow shot assist image, an area whose center is the background center and that has a predetermined size as the background area. In addition, the coordinate/size calculator 144 sets a magnification rate of the background area from a relation between a size of the background area before the magnification thereof and a screen size of the LCD 172.

The magnifier 145 performs the magnification display process that magnifies the background area around the background center as a magnification center at the set magnification rate, which makes it possible to display an easy-to-view image including the background object on the LCD 172.

Also as for the main object area, center coordinates (main object center) that is a magnification center of the magnification display process for the main object area can be set by performing a projection summing process on the main object motion vectors 1301 in the horizontal and vertical directions to acquire peak coordinates. The magnifier 145 performs the magnification display process that magnifies the main object area around the main object center (magnification center), which makes it possible to display an easy-to-view image including the main object on the LCD 172.

Figure 19:
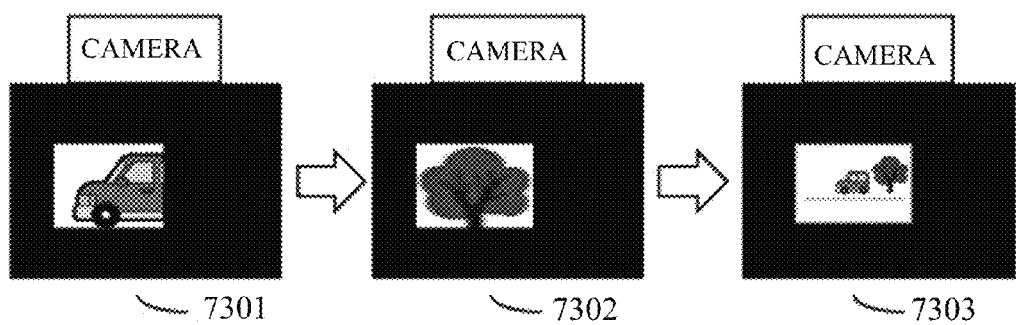
FIG. 19 illustrates a display changeover in Embodiment 1.

FIG. 19 illustrates a magnified image 7301 of the main object area, a magnified image 7302 of the background area and a follow shot assist image (entire image) 7303, which are sequentially displayed on the LCD 172 by the follow shot assist image display process described with referring to FIG. 10.

As understood from FIG. 19, even though the LCD 172 has a small screen size, since the magnified main object area and the magnified background area are respectively displayed on the LCD 172, the user can easily check the image quality of the follow shot assist image, such as a degree of stillness (presence or absence of blurring) of the main object and a degree of flowing of the background object.

Embodiment 2

Next, description will be made of a method for setting a background area (and a main object area) as a second embodiment (Embodiment 2) of the present invention, which is a different method from that in Embodiment 1. At step S704 in FIG. 10, the coordinate/size calculator 144 sets the background area by a method illustrated in FIG. 14.

Figure 14:
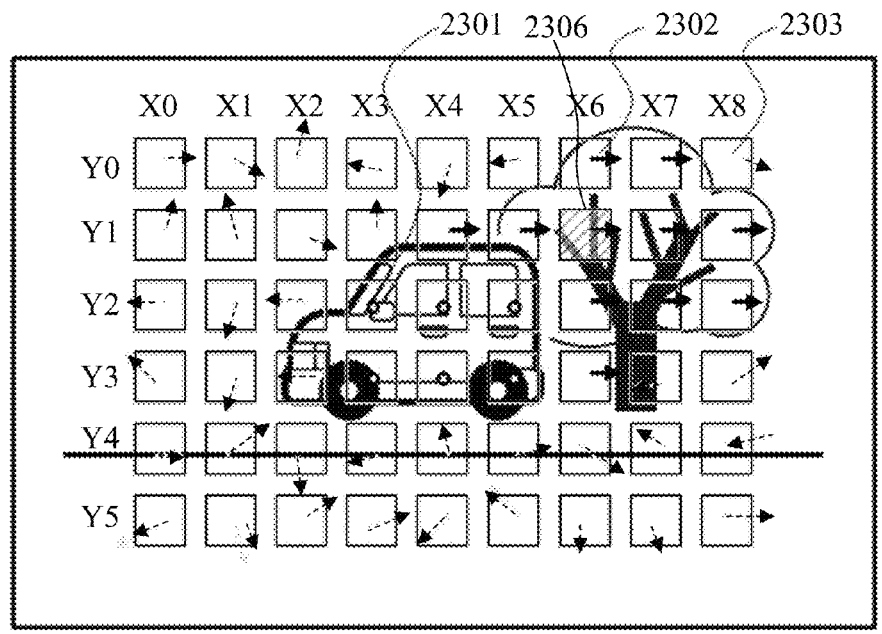
FIG. 14 illustrates a method for setting a magnification center of a background area in Embodiment 2.

In FIG. 14, reference numeral 2301 denotes main object motion vectors determined by the vector discriminator 143 in an area where an image of a car that is a main object exists in a live-view image produced during camera panning. Reference numeral 2302 denotes background motion vectors determined by the vector discriminator 143 in an area where an image of a tree that is a background object exists in the above live-view image. Reference numeral 2303 denotes erroneously detected motion vectors determined by the vector discriminator 143 as being neither the main object motion vector nor the background motion vector.

The background motion vectors 2302 whose total number is 11 are detected at 11 coordinates: (X4,Y1), (X5,Y1), (X6,Y0), (X6,Y1), (X6,Y2), (X6,Y3), (X7,Y0), (X7,Y1), (X7,Y2), (X8,Y1) and (X8,Y2).

In this embodiment, the coordinate/size calculator 144 calculates a coordinate X of a horizontal centroid of the 11 background motion vectors 2302 using following expression (1) and calculates a coordinate Y of a vertical centroid of the 11 background motion vectors 2302 using following expression (2).

$$X=(X4+X5+X6\times4+X7\times3+X8\times2)/11 \quad (1)$$

$$Y=(Y0\times2+Y1\times5+Y2\times3+Y3)/11 \quad (2)$$

The coordinate/size calculator 144 sets, in the follow shot assist image, coordinates corresponding to centroid coordinates (X,Y) 2306 thus calculated as a background center.

The coordinate/size calculator 144 further sets, in the follow shot assist image, an area whose center is the background center and that has a predetermined size as the background area. In addition, the coordinate/size calculator 144 sets a magnification rate of the background area from a relation between a size of the background area before the magnification thereof and a screen size of the LCD 172.

The magnifier 145 performs the magnification display process that magnifies the background area around the background center (magnification center) at the set magnification rate, which makes it possible to display an easy-to-view image including the background object on the LCD 172.

Also as for the main object area, center coordinates (main object center) that is a magnification center of the magnification display process for the main object area can be set by calculating horizontal and vertical centroid coordinates of the main object motion vectors 2301. The magnifier 145 performs the magnification display process that magnifies the main object area around the main object center, which makes it possible to display an easy-to-view image including the main object on the LCD 172.

Embodiment 3

Next, description will be made of a method for setting a background area (and a main object area) as a third embodiment (Embodiment 3) of the present invention, which is a different method from those in Embodiments 1 and 2. At step S704 in FIG. 10, the coordinate/size calculator 144 sets the background area by a method illustrated in FIG. 15.

Figure 15:
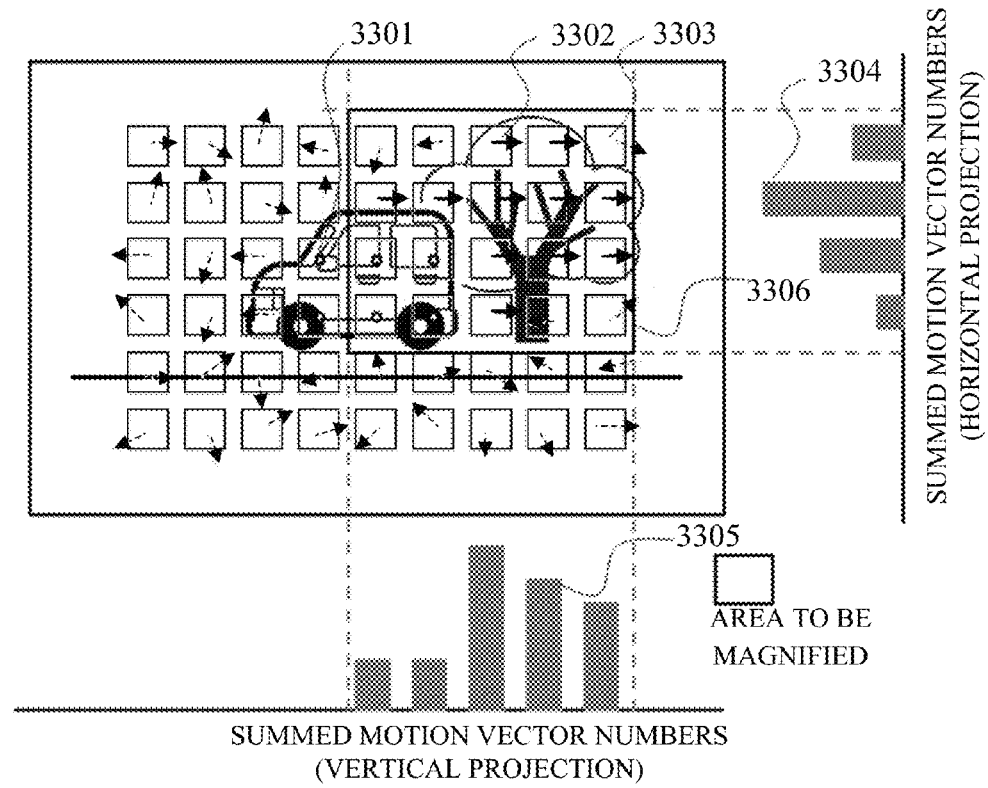
FIG. 15 illustrates a method for setting a background area in Embodiment 3.

In FIG. 15, reference numeral 3301 denotes main object motion vectors determined by the vector discriminator 143 in an area where an image of a car that is a main object exists in a live-view image produced during camera panning. Reference numeral 3302 denotes background motion vectors determined by the vector discriminator 143 in an area where an image of a tree that is a background object exists in the above live-view image. Reference numeral 3303 denotes erroneously detected motion vectors determined by the vector discriminator 143 as being neither the main object motion vector nor the background motion vector.

As in FIG. 13, right part of FIG. 15 illustrates a graph 3304 showing summed motion vector numbers of the background motion vectors 3302 horizontally projected at respective vertical coordinates. A lower part of FIG. 15 illustrates a graph 3305 showing summed motion vector numbers of the background motion vectors 3302 vertically projected at respective horizontal coordinates.

The coordinate/size calculator 144 performs such a projection summing process on the background motion vectors to acquire a horizontal range and a vertical range where the summed vector numbers of the background motion vectors at the respective horizontal and vertical coordinates are larger (more) than a predetermined value. The coordinate/size calculator 144 further sets, in the follow shot assist image, an area corresponding to an area 3306 having these horizontal and vertical ranges, which is surrounded by a bold line in FIG. 15, as the background area. In addition, the coordinate/size calculator 144 sets a magnification rate of the background area from a relation between a size of the background area before the magnification thereof and a screen size of the LCD 172.

The magnifier 145 performs the magnification display process that magnifies the background area around its center (magnification center) at the set magnification rate, which makes it possible to display an easy-to-view image including the background object on the LCD 172.

The main object area also can be set by performing a projection summing process on the main object motion vectors in the horizontal and vertical directions to acquire horizontal and vertical ranges where the summed vector numbers of the main object motion vectors are larger than a predetermined value. The predetermined value for the main object motion vectors may be identical to or different from that for the background motion vectors.

The magnifier 145 performs the magnification display process that magnifies the main object area around its center (magnification center), which makes it possible to display an easy-to-view image including the main object on the LCD 172.

Embodiment 4

Next, description will be made of a method for setting a target area (partial background area) on which the magnification display process is performed, as a fourth embodiment (Embodiment 4) of the present invention. The method of this embodiment is a different method from that in Embodiment 3. At step S704 in FIG. 10, the coordinate/size calculator 144 sets the partial background area by a method illustrated in FIG. 16. The partial background area is set by removing, from the background area, an area overlapping the main object area.

Figure 16:
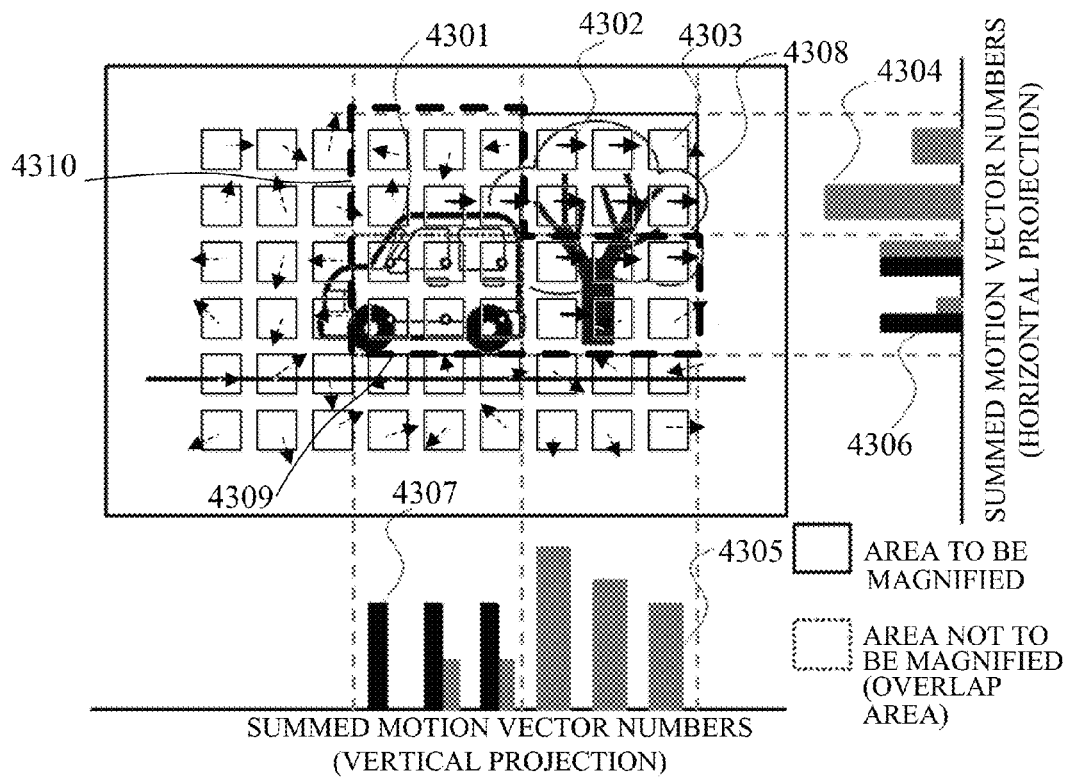
FIG. 16 illustrates a method for setting a background area in Embodiment 4.

In FIG. 16, reference numeral 4301 denotes main object motion vectors determined by the vector discriminator 143 in an area where an image of a car that is a main object exists in a live-view image produced during camera panning. Reference numeral 4302 denotes background motion vectors determined by the vector discriminator 143 in an area where an image of a tree that is a background object exists in the above live-view image. Reference numeral 4303 denotes erroneously detected motion vectors determined by the vector discriminator 143 as being neither the main object motion vector nor the background motion vector.

A right part of FIG. 16 illustrates graphs 4306 and 4304 respectively showing summed motion vector numbers of the main object motion vectors 4301 and the background motion vectors 4302 horizontally projected at respective vertical coordinates at which the main object and background motion vectors 4301 and 4302 are detected. A lower part of FIG. 16 illustrates graphs 4307 and 4305 respectively showing summed motion vector numbers of the main object motion vectors 4301 and the background motion vectors 4302 vertically projected at respective horizontal coordinates at which the main object and background motion vectors 4301 and 4302 are detected.

The coordinate/size calculator 144 performs such a projection summing process on the background motion vectors to acquire a horizontal range and a vertical range where the summed vector numbers of the background motion vectors at the respective horizontal and vertical coordinates are larger (more) than a predetermined value. The coordinate/size calculator 144 further sets, in the follow shot assist image, an area corresponding to an area 4310 having these horizontal and vertical ranges, which is surrounded by a bold line in FIG. 16, as the background area.

Moreover, the coordinate/size calculator 144 performs the above projection summing process on the main object motion vectors to acquire a horizontal range and a vertical range where the summed vector numbers of the main object motion vectors at the respective horizontal and vertical coordinates are larger (more) than a predetermined value. The predetermined value for the main object motion vectors may be identical to or different from that for the background motion vectors. The coordinate/size calculator 144 further sets, in the follow shot assist image, an area corresponding to an area 4309 having these horizontal and vertical ranges, which is surrounded by a dashed line in FIG. 16, as the main object area.

The coordinate/size calculator 144 removes, from the background area set as described above, an area overlapping the main object area to set the resulting area as the partial background area 4308. Then, the coordinate/size calculator 144 sets a magnification rate of the partial background area from a relation between a size of the partial background area before the magnification thereof and a screen size of the LCD 172.

The magnifier 145 performs the magnification display process that magnifies the partial background area around its center (magnification center) at the set magnification rate, which makes it possible to display an easy-to-view image including the background object and not including the main object on the LCD 172.

Embodiment 5

Next, description will be made of a method for setting a background area as a fifth embodiment (Embodiment 5) of the present invention, which is a different method from those in Embodiments 1 to 4. At step S704 in FIG. 10, the coordinate/size calculator 144 sets the background area by a method illustrated in FIGS. 17 and 18.

Figure 17:
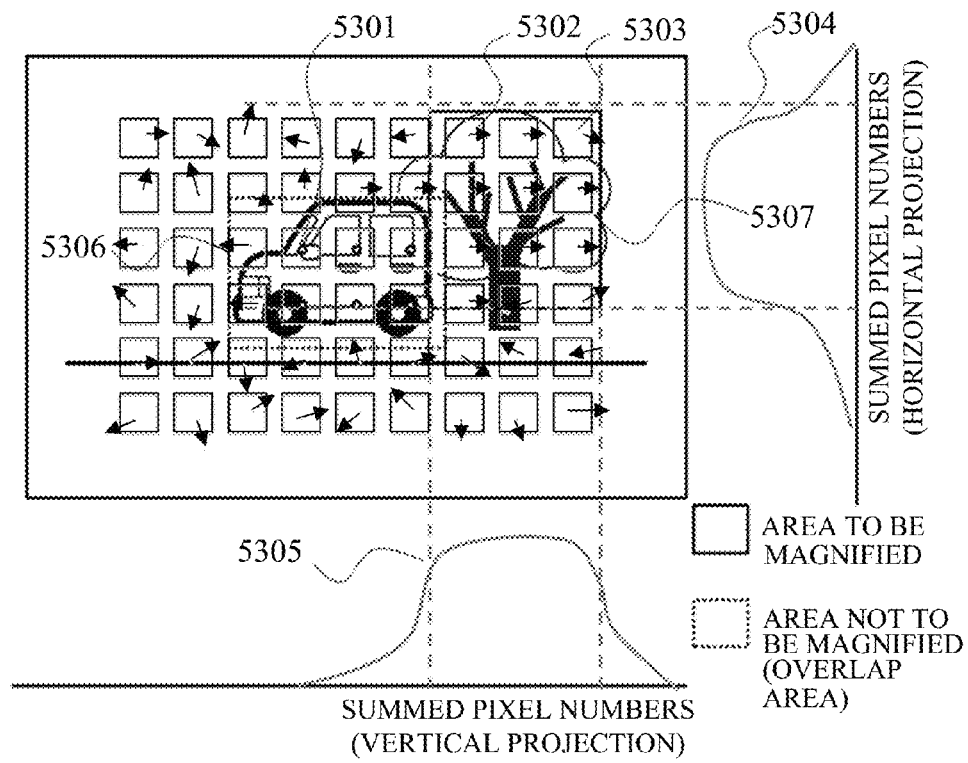
FIG. 17 illustrates a method for setting a background area in Embodiment 5.

FIG. 17 illustrates a case where the vector discriminator 143 detects, in a live-view image, main object motion vectors 5301 but does not detect background motion vectors 5302, in other words, a case where the vector discriminator 143 detects the background motion vectors 5302 as part of erroneously detected motion vectors 5303. Reference numeral 5306 denotes a main object area set by any one of the methods described in Embodiments 1 to 4 using the main object motion vectors 5301.

The coordinate/size calculator 144 horizontally and vertically projects, in an area set by removing the main object area 5306 from the follow shot assist image, pixels whose chromas (that is, color difference absolute values) are larger than a predetermined threshold and sums numbers of these projected pixels (hereinafter referred to as "specific pixels") at respective vertical and horizontal coordinates.

A right part of FIG. 17 illustrates a graph 5304 showing summed numbers (summed pixel numbers) of the specific pixels horizontally projected at the respective vertical coordinates.

A lower part of FIG. 17 illustrates a graph 5305 showing summed pixel numbers of the specific pixels vertically projected at the respective horizontal coordinates.

The coordinate/size calculator 144 performs such a projection summing process on the specific pixels to acquire a horizontal range and a vertical range where the summed pixel numbers at the respective horizontal and vertical coordinates are larger (more) than a predetermined value(s). The coordinate/size calculator 144 further sets, in the follow shot assist image, an area corresponding to an area (surrounded by a bold line in FIG. 17) having these horizontal and vertical ranges as the background area.

Then, the coordinate/size calculator 144 sets a magnification rate of the background area as in Embodiments 1 to 4, and the magnifier 145 performs the magnification display process that magnifies the background area around its center (magnification center) at the set magnification rate.

This embodiment enables setting the background area even in the case where no background motion vector is detected and therefore enables performing the magnification display process on the background area.

Figure 18:
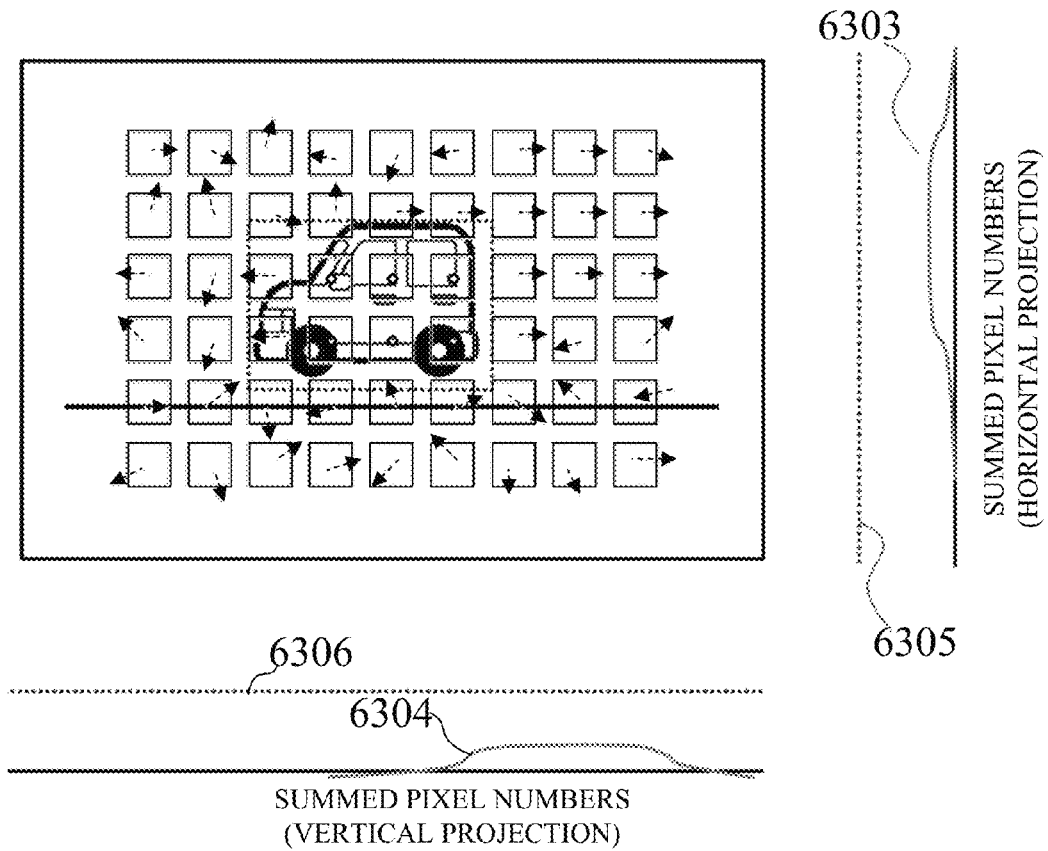
FIG. 18 illustrates a case where the background area cannot be acquired in Embodiment 5.

FIG. 18 illustrates a case where although the projection summing process is performed on the specific pixels whose color difference absolute values are larger than the threshold, all the summed pixel numbers (illustrated by graphs 6303 and 6304) at the respective vertical and horizontal coordinates are equal to or smaller than the predetermined values illustrated by lines 6305 and 6306.

In this case, since the background area cannot be specified, the magnification display process is also not performed. In this case, warning information may be displayed on the LCD 172 which indicates that a magnified background area is not displayed.

Embodiment 6

Embodiment 1 described the case of performing the magnification display process on the main object and background areas when displaying the follow shot assist image as the preview image. On the other hand, a sixth embodiment (Embodiment 6) of the present invention performs the magnification display process on the main object and background area when reproducing the follow shot assist image previously recorded in a recording medium.

Figures 11A, 11B:
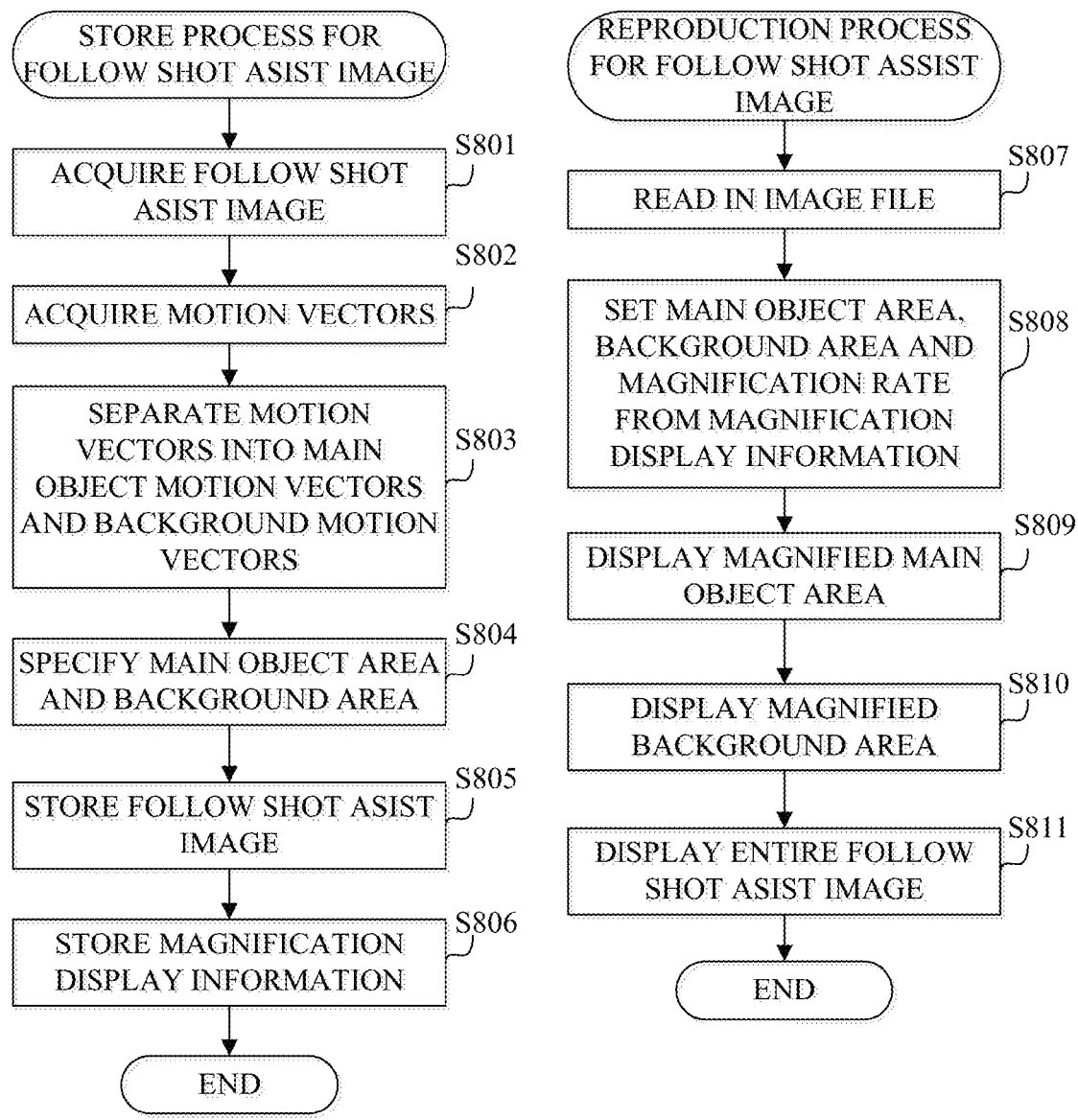
FIG. 11A is a flowchart illustrating a follow shot assist image storage process performed by a camera body that is Embodiment 6 of the present invention.
FIG. 11B is a flowchart illustrating a follow shot assist image reproduction process performed by the camera body of Embodiment 6.

FIGS. 11A and 11B respectively illustrate a storage process and a reproduction process that the camera signal processor 124 (including the vector discriminator 143, the coordinate/size calculator 144 and the magnifier 145) performs on the follow shot assist image. The camera signal processor 124 executes these processes according to an image processing program as a computer program.

First, description will be made of the storage process illustrated in FIG. 11A. At step S801, the camera signal processor 124 takes in a follow shot assist image acquired by image capturing for recording as a target image for the magnification display process.

Next, at step S802, the camera signal processor 124 acquires motion vectors detected by the motion vector detector 141 at multiple coordinates in a live-view image produced immediately before start of the image capturing for recording during camera panning.

Next, at step S803, the camera signal processor 124 discriminates the motion vectors acquired at the multiple coordinates at step S802 to separate them into the above-described main object motion vectors and background motion vectors.

Next, at step S804, the camera signal processor 124 sets (specifies), using the separated main object motion vectors and background motion vectors, the above-described main object area and background area in the follow shot assist image. This setting of the main object and background areas at step S804 uses the setting method at step S704 of FIG. 10 described in any one of Embodiments 1 to 5.

Next, at step S805, the camera signal processor 124 records (stores) an image file of the follow shot assist image to a recording medium through the recorder 171.

Next, at step S806, the camera signal processor 124 stores, to a management region (information storage unit) where information on captured images are stored and managed, information necessary for the magnification display process (hereinafter referred to as "magnification display information"). The magnification display information includes positions and sizes of the main object and background areas and magnification rates at which the main object and background areas are magnified. Then, the storage process is ended.

Next, description will be made of the reproduction process illustrated in FIG. 11B. At step S807, the camera signal processor 124 reads in the image file (follow shot assist image) stored in the recording medium.

Next, at step S808, the camera signal processor 124 reads in, from the management region, the magnification display information corresponding to the read image file. Then, the camera signal processor 124 sets, on a basis of the magnification display information, the main object area, the background area, the magnification rates and others.

Next, at step S809, the camera signal processor 124 performs the magnification display process on the set main object area. The camera signal processor 124 proceeds to step S810 in response to an elapse of a predetermined period of time after start of the display of the magnified main object area or in response to an operation of the display changeover switch included in the operation switches 131.

At step S810, the camera signal processor 124 performs the magnification display process on the set background area. The camera signal processor 124 proceeds to step S811 in response to an elapse of the predetermined time after start of the display of the magnified background area or in response to an operation of the display changeover switch included in the operation switches 131.

At step S811, the camera signal processor 124 displays the entire follow shot assist image as a normal reproduction image on the LCD 172.

This embodiment can display, even at the reproduction of the follow shot assist image stored in the recording medium, the magnified main object and background areas thereof. Thus, this embodiment enables the user to easily check an image quality of the follow shot assist image, such as a degree of stillness of the main object and a degree of flowing of the background object.

Embodiment 7

Figure 8:
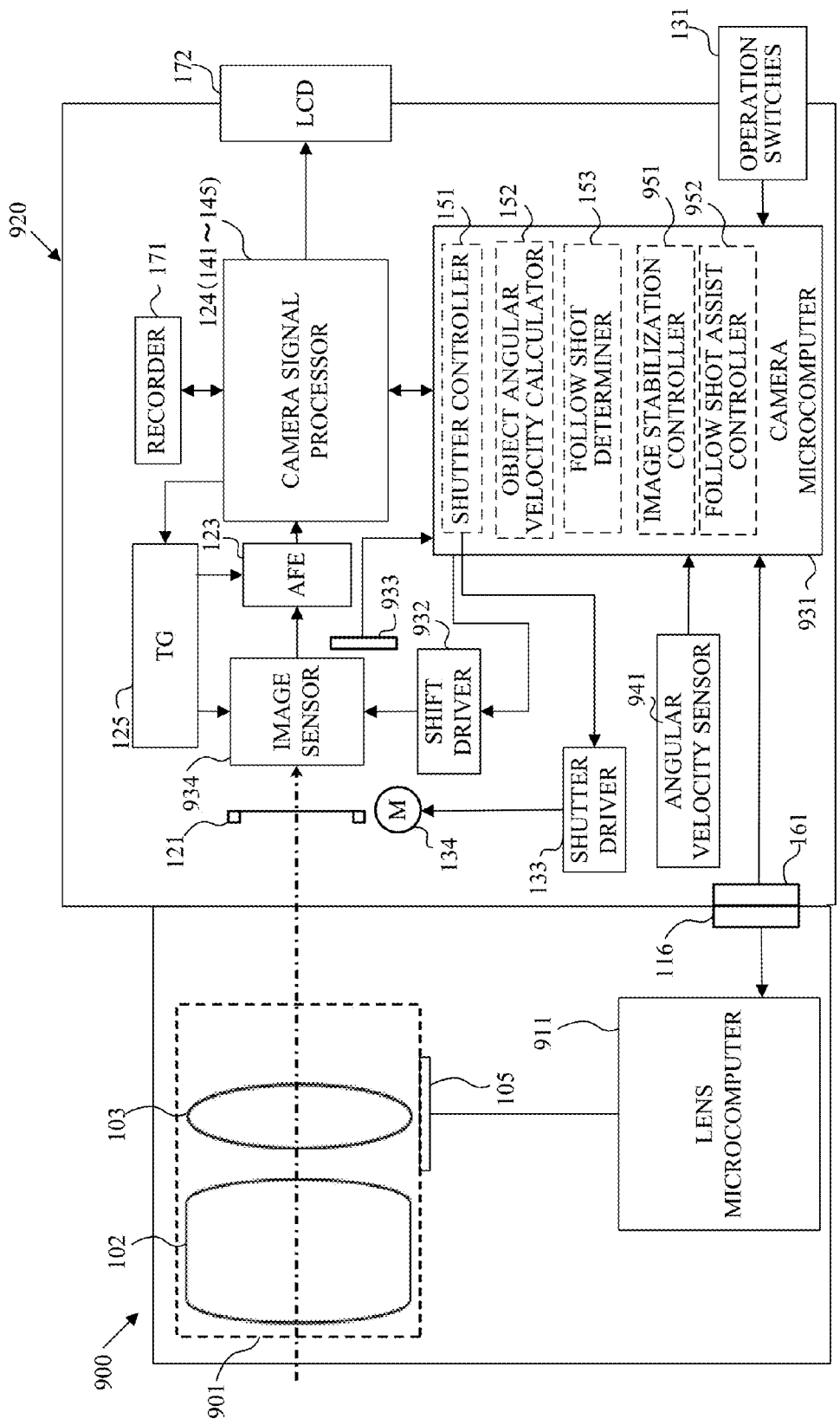
FIG. 8 illustrates a configuration of a lens-interchangeable camera system that is Embodiment 7 of the present invention.

FIG. 8 illustrates a configuration of a lens-interchangeable camera system (hereinafter simply referred to as "a camera") including a camera body 930 that is a seventh embodiment (Embodiment 7) of the present invention. In FIG. 8, constituent elements common to those illustrated in FIG. 1 are denoted by the same reference numerals as those in FIG. 1, and their description will be omitted.

Embodiment 1 described the case of preforming the shift drive of the shift lens unit 104 as the shift element included in the image capturing optical system 101 to perform the image stabilization and the follow shot assist. On the other hand, this embodiment performs shift drive of an image sensor 934 as a shift element in the camera body 930 in directions orthogonal to the optical axis of the image capturing optical system 101 to perform the image stabilization and the follow shot assist.

In the camera body 920 of this embodiment, a camera signal processor 924 includes only the motion vector detector 141, the object detector 142 and the vector discriminator 143. On the other hand, a camera microcomputer 931 includes, in addition to the shutter controller 151, the object angular velocity calculator 152 and the follow shot determiner 153, an image stabilization controller 951 and a follow shot assist controller 952, which are included in the lens microcomputer 113 in the camera illustrated in FIG. 3.

Furthermore, the camera body 920 of this embodiment includes an angular velocity sensor 941 and a shift position sensor 933, which are included in the interchangeable lens 120 in the camera illustrated in FIG. 3. The angular velocity sensor 941 is configured to detect an angular velocity of the camera body 920 (that is, of the camera), and the shift position sensor 933 is configured to detect a shift position of the image sensor 934.

The image stabilization controller 951 and the follow shot assist controller 952 are configured to control, depending on the angular velocity detected by the angular velocity sensor 941 and the shift position detected by the shift position sensor 933, a shift driver 932 configured to perform the shift drive of the image sensor 934. Thereby, an image stabilization drive and a follow shot assist drive of the image sensor 934 are controlled.

The display process of the follow shot assist image described in any one of Embodiments 1 to 5 and the storage and reproduction processes of the follow shot assist image described in Embodiment 6 can be performed in the above camera performing the shift drive of the image sensor 934.

Furthermore, the display process of the follow shot assist image described in any one of Embodiments 1 to 5 and the storage and reproduction processes of the follow shot assist image described in Embodiment 6 can be performed in a lens-integrated camera that is not a lens-interchangeable camera.

Each of Embodiments 1 to 7 automatically magnifies and displays the main object area and the background area in the follow shot assist image, which enables the user to easily check the image quality of the follow shot assist image without requiring user's operations for selecting the main object and background areas and for magnifying these areas.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132639, filed on Jul. 1, 2015, which is hereby incorporated by reference herein in its entirety.

What is claimed is:

1. An image processing apparatus (a) used in an image capturing apparatus including a display unit and (b) configured to perform a process for displaying a still image acquired by the image capturing apparatus during its panning to follow a moving main object, the image processing apparatus comprising at least one processor or circuit configured to perform operations of the following units:
    a vector acquiring unit configured to acquire, from multiple motion vectors detected at multiple positions in a moving image acquired by the image capturing apparatus during the panning, a background motion vector corresponding to a background object different from the main object; and
    a processing unit configured (a) to determine, using the background motion vector, a background area of the still image where the background object is captured and (b) to perform a magnification display process for magnifying the background area as compared with a case where the display unit displays the entire still image and causing the display unit to display the magnified background area.

2. An image processing apparatus according to claim 1, wherein:
    the vector acquiring unit is configured to further acquire, from the multiple motion vectors, a main object motion vector corresponding to the main object; and
    the processing unit is configured (a) to further determine, using the main object motion vector, a main object area of the still image where the main object is captured and (b) to perform the magnification display process for magnifying the main object area and the background area as compared with the case where the display unit displays the entire still image and causing the display unit to display the magnified main object area and the magnified background area.

3. An image processing apparatus according to claim 1, wherein the processing unit is configured to set, using the background motion vector, at least one of the background area, a magnification center around which the background area is magnified and a size of the background area.

4. An image processing apparatus according to claim 3, wherein:
    the vector acquiring unit is configured to acquire, from the multiple motion vectors, a multiple number of the background motion vectors, and
    the processing unit is configured to set the magnification center to a position in the still image corresponding to a position in the motion image specified by a horizontal coordinate and a vertical coordinate where numbers of the background motion vectors are largest respectively in a horizontal direction and a vertical direction.

5. An image processing apparatus according to claim 3, wherein:
    the vector acquiring unit is configured to acquire, from the multiple motion vectors, a multiple number of the background motion vectors, and the processing unit is configured to set the magnification center to a position in the still image corresponding to a centroid of the multiple motion vectors in the motion image.

6. An image processing apparatus according to claim 3, wherein:
the vector acquiring unit is configured to acquire, from the multiple motion vectors, a multiple number of the background motion vectors, and
the processing unit is configured to set the background area to an area in the still image corresponding to an area in the motion image whose horizontal range and vertical range include larger numbers of the background motion vectors than a predetermined value respectively in a horizontal direction and a vertical direction.

7. An image processing apparatus according to claim 1, wherein:
the vector acquiring unit is configured to further acquire, from the multiple motion vectors, a main object motion vector corresponding to the main object; and
the processing unit is configured (a) to determine, using the main object motion vector, a main object area of the still image where the main object is captured and (b) to perform, when the still image includes an overlap area where the main object area overlaps the background area, the magnification display process so as to magnify a partial background area set by removing the overlap area from the background area and to cause the display unit to display the magnified partial background area.

8. An image processing apparatus according to claim 1, wherein the processing unit is configured to perform, when no background motion vector is acquired by the vector acquiring unit, the magnification display process on a basis of a chroma of the still image.

9. An image processing apparatus according to claim 1, wherein:
the image capturing apparatus or an interchangeable lens detachably attached to the image capturing lens performs, on a basis of a motion vector corresponding to the main object, a shift control for driving a shift element movable in directions other than an optical axis direction of an image capturing optical system of the image capturing apparatus or the interchangeable lens during the panning; and
the processing unit is configured to perform the magnification display process on a still image acquired with the shift control of the shift element.

10. An image capturing apparatus comprising:
an image capturing unit configured to perform image capturing of an object;
a display unit configured to display an image; and
an image processing apparatus configured to perform a process for displaying a still image acquired by the image capturing apparatus during its panning to follow a moving main object,
wherein the image processing apparatus comprising at least one processor or circuit configured to perform operations of the following units:
a vector acquiring unit configured to acquire, from multiple motion vectors detected at multiple positions in a moving image acquired by the image capturing apparatus during the panning, a background motion vector corresponding to a background object different from the main object; and
a processing unit configured (a) to determine, using the background motion vector, a background area of the still image where the background object is captured and (b) to perform a magnification display process for magnifying the background area as compared with a case where the display unit displays the entire still image and causing the display unit to display the magnified background area.

11. An image capturing apparatus according to claim 10, wherein the image processing apparatus is configured to cause the display unit, in acquiring the still image, to display the magnified background area as an image to be checked.

12. An image capturing apparatus according to claim 10, further comprising an information storing unit configured to store information to be used for performing the magnification display process on the background area,
wherein the processing unit is configured to, when the still image read from a recording medium is reproduced, perform the magnification display process on the background area using the information read from the information storing unit.

13. A non-transitory computer-readable storage medium storing an image processing program as a computer program to cause a computer of an image capturing apparatus including a display unit to perform a process for displaying a still image acquired by the image capturing apparatus during its panning to follow a moving main object, the process comprising:
a vector acquisition process for acquiring, from multiple motion vectors detected at multiple positions in a moving image acquired by the image capturing apparatus during the panning, a background motion vector corresponding to a background object different from the main object; and
a display process (a) for determining, using the background motion vector, a background area of the still image where the background object is captured and (b) for performing a magnification display process for magnifying the background area as compared with a case where the display unit displays the entire still image and causing the display unit to display the magnified background area.

* * * * *